(12) United States Patent
Katagiyama et al.

(10) Patent No.: US 10,992,085 B2
(45) Date of Patent: Apr. 27, 2021

(54) RECEPTACLE

(71) Applicant: JAPAN AVIATION ELECTRONICS INDUSTRY, LIMITED, Tokyo (JP)

(72) Inventors: Naoki Katagiyama, Tokyo (JP); Masaki Ishiguro, Tokyo (JP); Takayuki Tanaka, Tokyo (JP); Akihiro Tosaki, Tokyo (JP); Shingo Nakajima, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 16/785,532

(22) Filed: Feb. 7, 2020

(65) Prior Publication Data

US 2020/0319413 A1    Oct. 8, 2020

(30) Foreign Application Priority Data

Apr. 4, 2019   (JP) .............................. JP2019-072155

(51) Int. Cl.
| | |
|---|---|
| *H01R 13/6582* | (2011.01) |
| *H01R 13/502* | (2006.01) |
| *H01R 24/38* | (2011.01) |
| *H01R 13/6594* | (2011.01) |
| *H01R 13/6581* | (2011.01) |
| *G02B 6/38* | (2006.01) |
| *G02B 6/42* | (2006.01) |

(52) U.S. Cl.
CPC ....... *H01R 13/6582* (2013.01); *H01R 13/502* (2013.01); *H01R 13/6581* (2013.01); *H01R 13/6594* (2013.01); *H01R 24/38* (2013.01); *G02B 6/3897* (2013.01); *G02B 6/428* (2013.01); *G02B 6/4261* (2013.01)

(58) Field of Classification Search
None
See application file for complete search history.

(56) References Cited

U.S. PATENT DOCUMENTS

| | | | |
|---|---|---|---|
| 6,729,905 | B1 | 5/2004 | Hwang |
| 10,018,793 | B2 | 7/2018 | Katagiyama et al. |
| 10,295,764 | B2 | 5/2019 | Koreeda et al. |
| 2018/0156995 | A1 | 6/2018 | Katagiyama et al. |
| 2019/0049678 | A1 | 2/2019 | Koreeda et al. |

FOREIGN PATENT DOCUMENTS

| | | |
|---|---|---|
| JP | 2002311307 A | 10/2002 |
| JP | 2018092051 A | 6/2018 |
| JP | 2019032432 A | 2/2019 |

OTHER PUBLICATIONS

Extended European Search Report (EESR) dated Aug. 7, 2020 issued European Application No. 20159821.6.

*Primary Examiner* — Michael Stahl
(74) *Attorney, Agent, or Firm* — Holtz, Holtz & Volek PC

(57) ABSTRACT

A receptacle comprises a shell made of metal and a cage formed of one or more metal plates. The shell is attachable to a case made of metal. The cage is mountable on a board arranged in the case. The cage receives an internal module under a mated state where the receptacle is mated with a plug. The cage has a cage rear plate and is provided with a terminal made of metal and a contact portion made of metal. The terminal extends downward from the cage rear plate. The contact portion is nearer to the cage rear plate than to the front end of the cage in a front-rear direction. When the cage is mounted on the board and the shell is attached to the case, the shell covers the cage, the terminal is fixed to the board, and the contact portion is pressed against the shell.

9 Claims, 16 Drawing Sheets

RECEPTACLE

CROSS REFERENCE TO RELATED APPLICATIONS

This application is based on and claims priority under 35 U.S.C. § 119 to Japanese Patent Application No. JP2019-072155 filed Apr. 4, 2019, the content of which is incorporated herein in its entirety by reference.

BACKGROUND OF THE INVENTION

This invention relates to a receptacle of a connector assembly that comprises an internal module.

For example, this type of receptacle is disclosed in JP2018-092051A (Patent Document 1) and JP2019-032432A (Patent Document 2), the contents of which are incorporated herein by reference.

Referring to FIG. 31, Patent Document 1 discloses a connector assembly 90 comprising a connector (receptacle) 91 and a mating connector (plug) 92. The receptacle 91 comprises a receptacle (shell) 912 made of metal, a cage 914 made of metal and an internal module 918 such as a small form-factor pluggable (SFP) module. The shell 912 is attached to a case 94 made of metal. The cage 914 is mounted on a board 93 arranged in the case 94 and is connected to the shell 912. The internal module 918 is accommodated in the cage 914. Thus, the connector assembly 90 comprises the internal module 918 accommodated in the receptacle 91. This structure might cause damage of the internal module 918 because of heat radiated into the cage 914.

Referring to FIG. 32, Patent Document 2 discloses a connector device (connector assembly) 95 comprising a receptacle connector (receptacle) 96 and a plug connector (plug) 97. The receptacle 96 comprises a receptacle (shell) 962 made of metal and a cage 964 made of metal. The cage 964 is mounted on a board 98 arranged in a case 99 made of metal. The shell 962 has three arms 963, only one of which is illustrated in FIG. 32. The shell 962 is positioned so that the arms 963 enclose and press the cage 964, and is then attached to the case 99. The plug 97 comprises an internal module 978 such as an SFP module. Thus, the connector assembly 95 comprises the internal module 978 accommodated in the plug 97.

With the structure of Patent Document 2, an electronic device such as a photoelectric converter of the internal module 978 is located outside the cage 964 and outside the case 99 even under a mated state where the receptacle 96 and the plug 97 are mated with each other. This structure intends to prevent damage of the internal module 978 which might be caused because of heat radiated into the cage 964.

However, the thus-produced connector assemblies 95 of Patent Document 2 include not only a good product in which heat transferred to the internal module 978 is reduced but also another product in which heat is easily transferred to the internal module 978. In other words, heat-transfer properties vary depending on products.

SUMMARY OF THE INVENTION

It is therefore an object of the present invention to provide a receptacle with a structure that enables reduction of heat transferred to an internal module.

The inventors of the present invention made prototypes of the connector assembly of Patent Document 2 to study the reasons of the variation in heat-transfer properties. This study has revealed that undesirable receptacles as well as desirable receptacles are produced depending on variation in component size and variation in positional relation between a shell and a cage in assembling process of a receptacle. The desirable receptacle has a shell and a cage that are in contact with each other even after the assembling process. In contrast, the undesirable receptacle has a shell and a cage that are hardly in contact with each other after the assembling process. The study has further revealed that the desirable receptacle enables heat transferred to the internal module to be reduced. Moreover, the study has revealed that the desirable receptacle enables heat transferred to the internal module to be reduced to some extent even when the internal module is accommodated in the receptacle as disclosed in Patent Document 1.

This invention provides, based on the aforementioned knowledge, a receptacle comprising a shell and a cage which are configured to be in secure contact with each other. More specifically, this invention provides a receptacle disclosed below.

An aspect of the present invention provides a receptacle of a connector assembly, the connector assembly further comprising a plug mateable with the receptacle and accommodating an internal module therein. The receptacle comprises a shell made of metal and a cage formed of one or more metal plates, the shell being attachable to a case made of metal, the cage being mountable on a board arranged in the case. The cage has a receiving space and a plurality of enclosing plates. The receiving space opens at a front end of the cage in a front-rear direction and receives the internal module under a mated state where the plug and the receptacle are mated with each other. The enclosing plates include a cage rear plate, a cage top plate and two cage side plates. The cage rear plate is located behind the receiving space in the front-rear direction. The cage top plate is located over the receiving space in an upper-lower direction perpendicular to the front-rear direction. The two cage side plates are located at opposite sides of the receiving space, respectively, in a lateral direction perpendicular to both the upper-lower direction and the front-rear direction. The cage is provided with a terminal made of metal and a contact portion made of metal. The terminal extends downward from the cage rear plate. The contact portion is nearer to the cage rear plate than to the front end of the cage in the front-rear direction. The contact portion has a spring portion and a contact point. When the cage is mounted on the board and the shell is attached to the case, the shell covers the cage, the terminal is fixed to the board, and the spring portion presses the contact point against the shell.

The receptacle may be further configured as described below. The contact portion is provided on at least one of the cage rear plate and the enclosing plate that is connected directly to the cage rear plate. The cage is provided with an additional contact portion made of metal. The additional contact portion is provided on at least one of the enclosing plates, the at least one of the enclosing plates being one of the cage top plate and the cage side plates and being not provided with the contact portion. The additional contact portion has a bent portion, an additional spring portion and an additional contact point. The bent portion is connected directly to the enclosing plate. The enclosing plate that is provided with the additional contact portion has no part that is located rearward of a boundary portion between the bent portion and the enclosing plate and that is connected to the cage rear plate. The additional spring portion extends forward and inward of the cage from the bent portion. The additional contact point is supported by the additional spring portion. The additional spring portion presses the additional contact point against the internal module under the mated state.

According to an aspect of the present invention, heat generated in the board is transferred to the shell and the case each having large heat capacity through the terminal made of metal, the cage formed of metal plate and the contact portion made of metal. Thus, the receptacle is formed with a heat-transfer path that efficiently transfers heat from the board to the case, so that influence of heat on the internal module can be reduced. This structure allows the internal module to be accommodated in either the plug or the receptacle.

According to an aspect of the present invention, the enclosing plate that is provided with the additional contact portion has no part that is located rearward of the boundary portion between the additional contact portion and the enclosing plate and that is connected to the cage rear plate. According to this structure, the heat-transfer path between the cage rear plate provided with the terminal and the internal module is made long. With this structure, heat of the board is further easily transferred to the case, so that heat-transfer efficiency to the case is improved.

An appreciation of the objectives of the present invention and a more complete understanding of its structure may be had by studying the following description of the preferred embodiment and by referring to the accompanying drawings.

Figure 1:
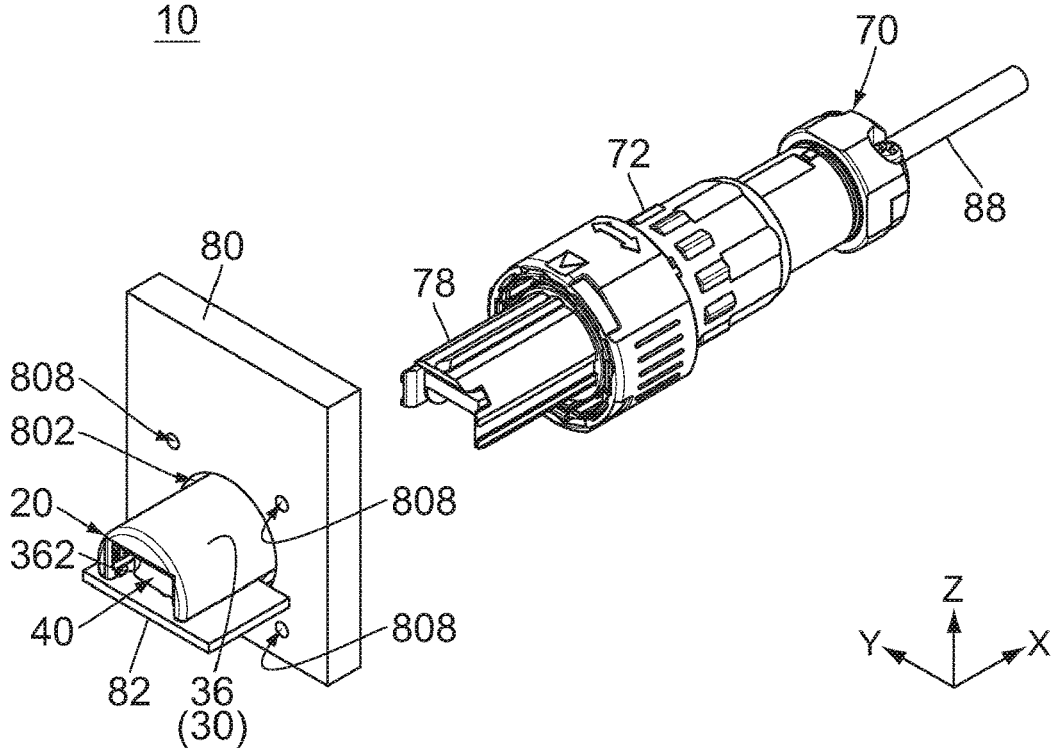
FIG. 1 is a perspective view showing a connector assembly according to an embodiment of the present invention, wherein a receptacle of the connector assembly is attached to a case and a board, and a plug of the connector assembly is attached to a cable.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 5:
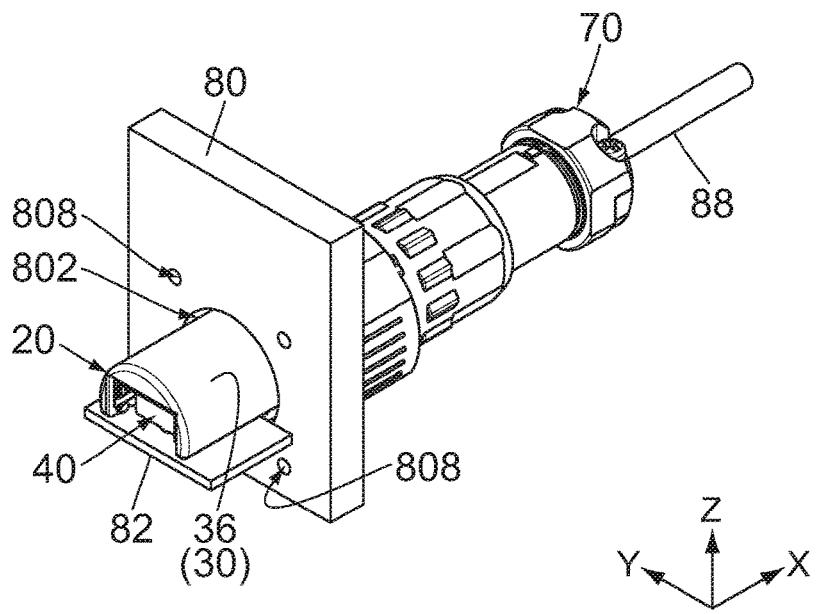
FIG. 5 is a perspective view showing the connector assembly of FIG. 1, wherein the receptacle and the plug are mated with each other.

Referring to FIGS. 1 and 5, a connector assembly 10 according to an embodiment of the present invention comprises a plug 70 and a receptacle 20 mateable with each other. The plug 70 is attached to one of ends of a cable 88 and is electrically connected to an electronic device (not shown) which is attached to a remaining one of the ends of the cable 88. The cable 88 of the present embodiment is an optical-fiber cable through which an optical signal is transmitted. The receptacle 20 is attached to a board 82 and a case 80 made of metal. The illustrated case 80 is a part of a case that accommodates another electronic device (not shown) therein. The board 82 is arranged in the case 80. The illustrated board 82 is a part of a circuit board on which various electronic components (not shown) are mounted.

As can be seen from the above explanation, the connector assembly 10 of the present embodiment is a connector device through which a signal is transmitted between the electronic device (not shown) connected to the cable 88 and the electronic device (not shown) located within the case 80. However, the present invention is not limited thereto but is applicable to various connector devices.

The plug 70 is mateable with the receptacle 20 along a mating direction (negative X-direction) when the receptacle 20 is located rearward of the plug 70 in a front-rear direction (X-direction) or located beyond the plug 70 in the negative X-direction. The plug 70 mated with the receptacle 20 can be removed from the receptacle 20 along a removing direction (positive X-direction). Thus, each of the mating direction and the removing direction of the present embodiment is a direction extending along the X-direction (front-rear direction).

Figure 4:
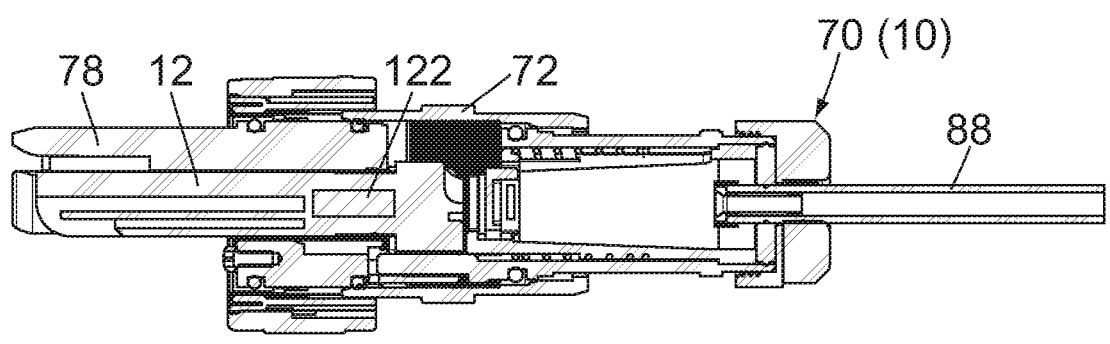
FIG. 4 is a cross-sectional view showing the plug of FIG. 2, taken along line IV-IV.
Figure 6:
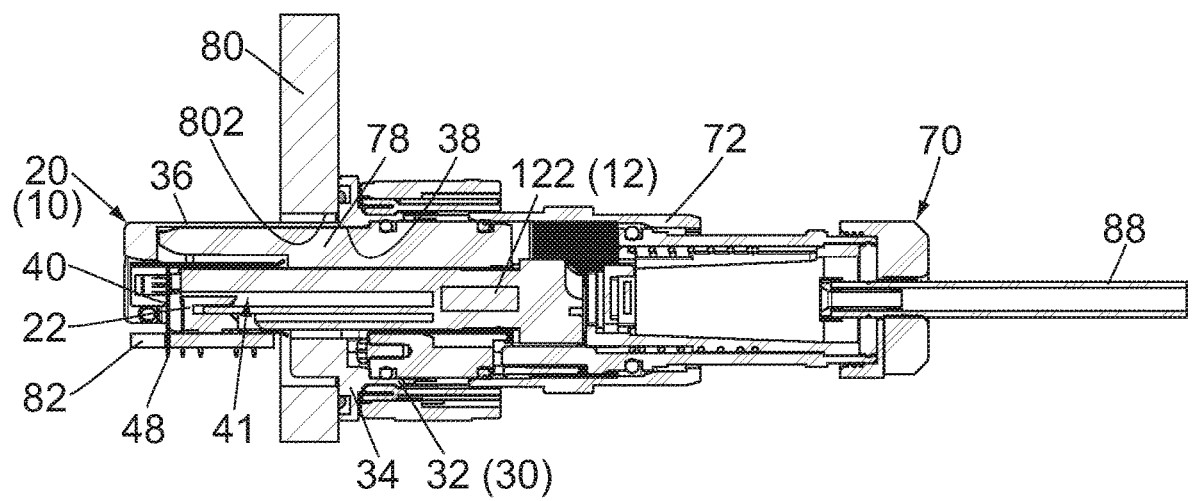
FIG. 6 is a cross-sectional view showing the connector assembly of FIG. 5, taken along line VI-VI of FIG. 2.

As shown in FIGS. 1, 4 and 6, the plug 70 has a body portion 72 and a fit portion 78. The fit portion 78 is a rear end portion, or a negative X-side end portion, of the plug 70 and projects rearward, or in the negative X-direction, from the body portion 72. Under a mated state where the plug 70 and the receptacle 20 are mated with each other, or under the state shown in FIG. 6, the fit portion 78 is received in the receptacle 20, while the body portion 72 is located outside the receptacle 20.

As shown in FIGS. 4 and 6, the plug 70 of the present embodiment comprises an internal module 12. The internal module 12 of the present embodiment is an optical communication module. More specifically, the internal module 12 of the present embodiment is a small form-factor pluggable (SFP) module comprising an electronic component such as a photoelectric converter 122 that converts an electrical signal and an optical signal into each other. The internal module 12 which works as described above is vulnerable to heat. In particular, the photoelectric converter 122 might work improperly or might be damaged because of heat. The internal module 12 of the present invention is not limited to the optical communication module but may be any module comprising an electronic component that is vulnerable to heat.

Referring to FIG. 6, the connector assembly 10 accommodates the aforementioned internal module 12 therein. In the present embodiment, the internal module 12 is accommodated in the plug 70. However, the present invention is not limited thereto. As described later, the internal module 12 may be accommodated in a receptacle.

Figure 3:
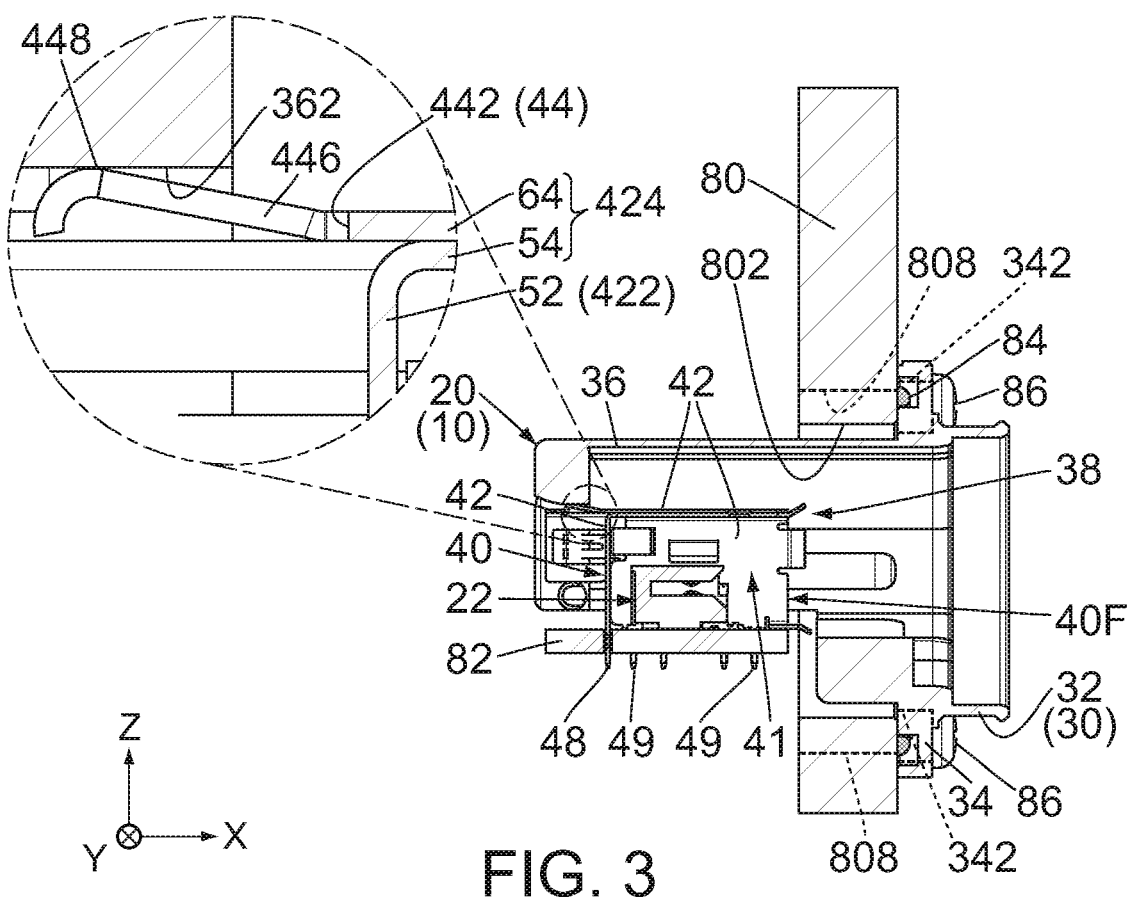
FIG. 3 is a cross-sectional view showing the receptacle of FIG. 2, taken along line III-III, wherein a part of an outline of a hidden screw hole of the case and a part of an outline of a hidden attachment hole of the receptacle are illustrated with dashed line, and a part of the receptacle enclosed by chain dotted lines is enlarged and illustrated.
Figure 7:
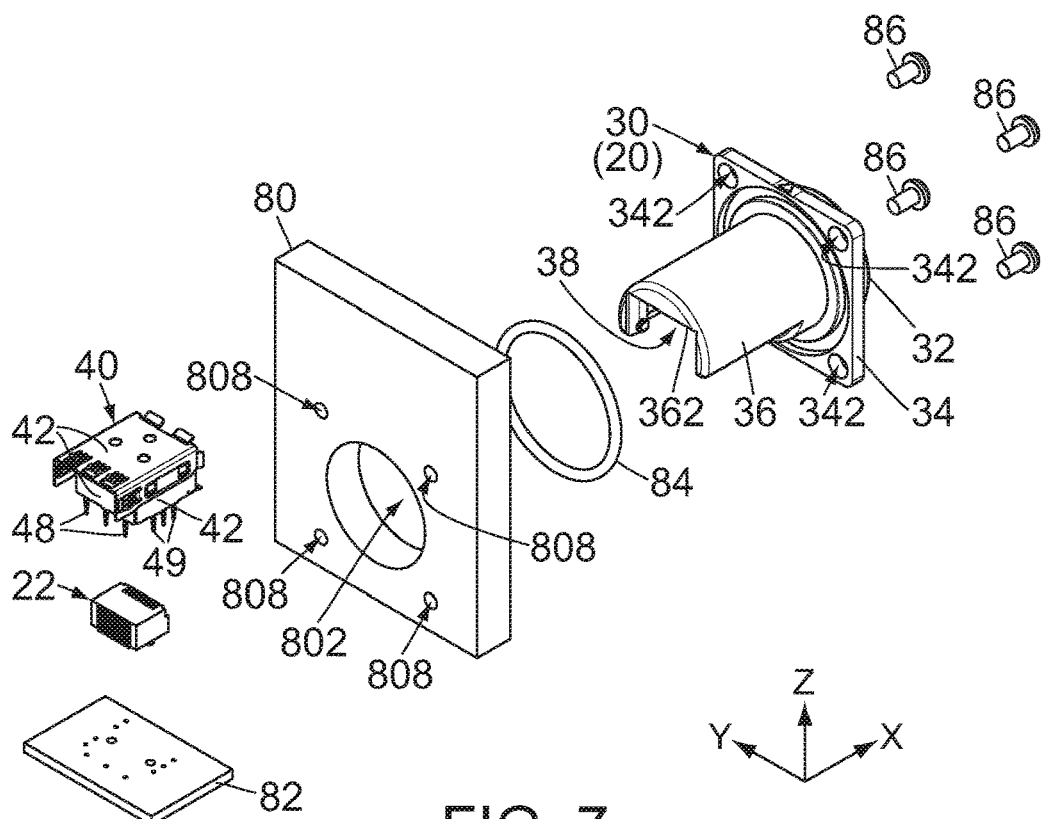
FIG. 7 is an exploded, perspective view showing the receptacle of FIG. 1.

Referring to FIGS. 3 and 7, the receptacle 20 of the present embodiment comprises an internal connector 22, a shell 30 made of metal and a cage 40 formed of one or more metal plates.

Referring to FIGS. 3 and 6, the internal connector 22 is an edge connector. When the receptacle 20 is used, the internal connector 22 is accommodated in the cage 40 and is mounted on and fixed to an upper surface, or a positive Z-side surface, of the board 82 in an upper-lower direction (Z-direction) perpendicular to the X-direction. Referring to FIG. 6, under the mated state, the internal connector 22 is connected to an electric connector (not shown) of the internal module 12 of the plug 70, so that the electronic device (not shown) connected to the cable 88 and the electronic device (not shown) located within the case 80 are electrically connected with each other.

Referring to FIGS. 3 and 7, the shell 30 has an annular portion 32, a flange 34 and a covering portion 36. The annular portion 32 has a ring-like shape as a whole. The annular portion 32 is located at a front end portion, or a positive X-side end portion, of the shell 30. The flange 34 is located rearward of the annular portion 32. The flange 34 has a rectangular shape in a perpendicular plane (YZ-plane) perpendicular to the X-direction and protrudes from the annular portion 32 in the YZ-plane. The flange 34 has four corners in the YZ-plane. The four corners are formed with four attachment holes 342, respectively. Each of the attachment holes 342 passes through the flange 34 in the X-direction. The covering portion 36 has a semi-circular shape in the YZ-plane. The covering portion 36 extends rearward from the flange 34.

Referring to FIGS. 3, 6 and 7, the shell 30 is formed with a plug receiving space 38. The plug receiving space 38 is a space located in the shell 30 and passes through the shell 30 in the X-direction. Referring to FIG. 6, the fit portion 78 of the plug 70 is inserted into and received in the plug receiving space 38 under the mated state. In other words, the plug receiving space 38 receives the plug 70 under the mated state.

Referring to FIGS. 3 and 7, the cage 40 has a plurality of enclosing plates 42. Referring to FIG. 3, the cage 40 is formed with a receiving space 41 which is enclosed by the enclosing plates 42. The receiving space 41 is a space located in the cage 40 and has a cuboid shape as a whole. The receiving space 41 opens at a front end 40F of the cage 40 in the X-direction and is covered by one of the enclosing plates 42 from behind. Thus, the cage 40 has the receiving space 41 and a plurality of the enclosing plates 42 which encloses the receiving space 41 so that the receiving space 41 opens forward, or in the positive X-direction.

Referring to FIGS. 3 and 7, the cage 40 has a plurality of terminals 48 and a plurality of auxiliary terminals 49. The terminals 48 are located in the vicinity of a rear end of the cage 40 and are arranged in a lateral direction (Y-direction) perpendicular to both the X-direction and the Z-direction. The auxiliary terminals 49 are grouped into two rows in the Y-direction. The two rows of the auxiliary terminals 49 are located at opposite sides of the cage 40 in the Y-direction, respectively. The auxiliary terminals 49 of each row are arranged in the X-direction. The terminal 48 and the auxiliary terminal 49 of the present embodiment have shapes same as each other. However, the present invention is not limited thereto. For example, the auxiliary terminal 49 may have a shape different from that of the terminal 48. The number of the terminals 48 may be one. The number of the auxiliary terminals 49 may be one. The auxiliary terminals 49 should be provided as necessary.

The cage 40 is mountable on the board 82. The cage 40 is mounted on the board 82 when the receptacle 20 is used. When the cage 40 is mounted on the board 82, each of the terminals 48 and the auxiliary terminals 49 is fixed to the board 82 and is connected to a ground pattern (not shown) via soldering, etc. The thus-mounted cage 40 is grounded to the board 82, and a heat-transfer path is formed between the board 82 and the cage 40 through the terminals 48 and the auxiliary terminals 49.

The shell 30 is attachable to the case 80. The shell 30 is attached to the case 80 when the receptacle 20 is used. The case 80 is formed with a passing hole 802 and four screw holes 808. The passing hole 802 has a size in the YZ-plane which is larger than that of the covering portion 36 of the shell 30 in the YZ-plane but is smaller than that of the flange 34 of the shell 30 in the YZ-plane. In an attachment process of the shell 30 to the case 80, an O-ring 84 made of elastomer is first attached to a rear-surface, or a negative X-side surface, of the flange 34. Then, the covering portion 36 is inserted rearward from front into the passing hole 802, so that the covering portion 36 passes through the passing hole 802. Then, four fixation screws 86 are screwed into the screw holes 808 of the case 80, respectively, through the attachment holes 342 of the flange 34. The thus-attached flange 34 is brought into close contact with a front surface, or a positive X-side surface, of the case 80 while pressing and elastically deforming the O-ring 84.

In the present embodiment, the shell 30 is securely fixed to the case 80 by using the fixation screws 86, so that the rear-surface of the flange 34 is reliably in surface contact with the front surface of the case 80. However, the attachment method of the shell 30 to the case 80 is not limited to that of the present embodiment, provided that a part of the shell 30 is in contact with the case 80 when the shell 30 is attached to the case 80.

Referring to FIG. 1, when the cage 40 is mounted on the board 82 and the shell 30 is attached to the case 80, the receptacle 20 is in an attached state. The receptacle 20 is mateable with the plug 70 under the attached state. Referring to FIGS. 3 and 6, the receiving space 41 of the cage 40 is located in the plug receiving space 38 under the attached state and partially receives the internal module 12 of the plug 70 under the mated state.

Figure 2:
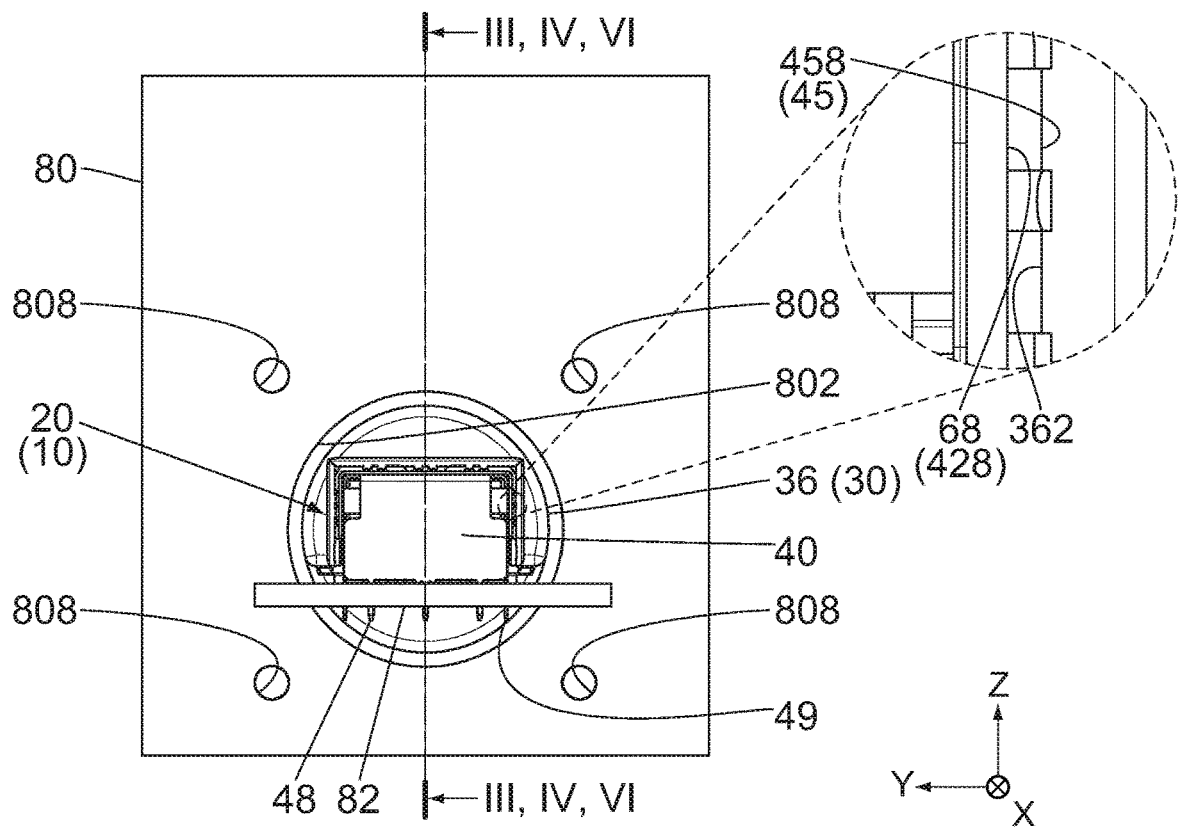
FIG. 2 is a rear view showing the connector assembly of FIG. 1, wherein a part of the receptacle enclosed by dashed line is enlarged and illustrated.

Referring to FIG. 3, under the attached state where the cage 40 is mounted on the board 82 and the shell 30 is attached to the case 80, the flange 34 of the shell 30 is pressed against the case 80 to be in contact with the case 80. The thus-attached shell 30 is reliably grounded to the case 80, and an effective heat-transfer path is formed between the shell 30 and the case 80. Referring to FIGS. 1 to 3, under the attached state, the shell 30 covers the cage 40. In detail, referring to FIG. 3, the covering portion 36 of the shell 30 almost entirely covers the cage 40 in the YZ-plane from the front end 40F to a rear end thereof. With this structure, heat generated in the cage 40 is efficiently radiated to the covering portion 36 of the shell 30, and the heat radiated to the covering portion 36 is efficiently transferred to the case 80 through the flange 34 of the shell 30.

Referring to FIGS. 2, 3 and 7, the covering portion 36 of the present embodiment has a protruding portion 362. The protruding portion 362 is located at a rear end of the covering portion 36 and protrudes toward the center of the plug receiving space 38 in the YZ-plane. Under the attached state where the cage 40 is mounted on the board 82 and the shell 30 is attached to the case 80, the terminals 48 and the auxiliary terminals 49 are fixed to the board 82, and the protruding portion 362 is brought into contact with a part of the cage 40. With this structure, heat transferred from the board 82 to the cage 40 through the terminals 48 and the auxiliary terminals 49 is easily transferred to the case 80 through the protruding portion 362. However, the present invention is not limited thereto. For example, the cage 40 may be connected not to the protruding portion 362 but to another part of the shell 30 under the attached state. Thus, the protruding portion 362 should be provided as necessary.

Referring to FIG. 3, the receptacle 20 of the present embodiment comprises the internal connector 22, the shell 30 and the cage 40 which are formed as described above. However, the present invention is not limited thereto. For example, the receptacle 20 should comprise the internal connector 22 as necessary. Instead, the receptacle 20 may further comprise another member in addition to the internal connector 22, the shell 30 and the cage 40. Moreover, the structure of the internal connector 22, the shell 30 and the cage 40 can be variously modified, provided that the shell 30 covers the cage 40 and is in contact with the cage 40 under the attached state.

Figure 8:
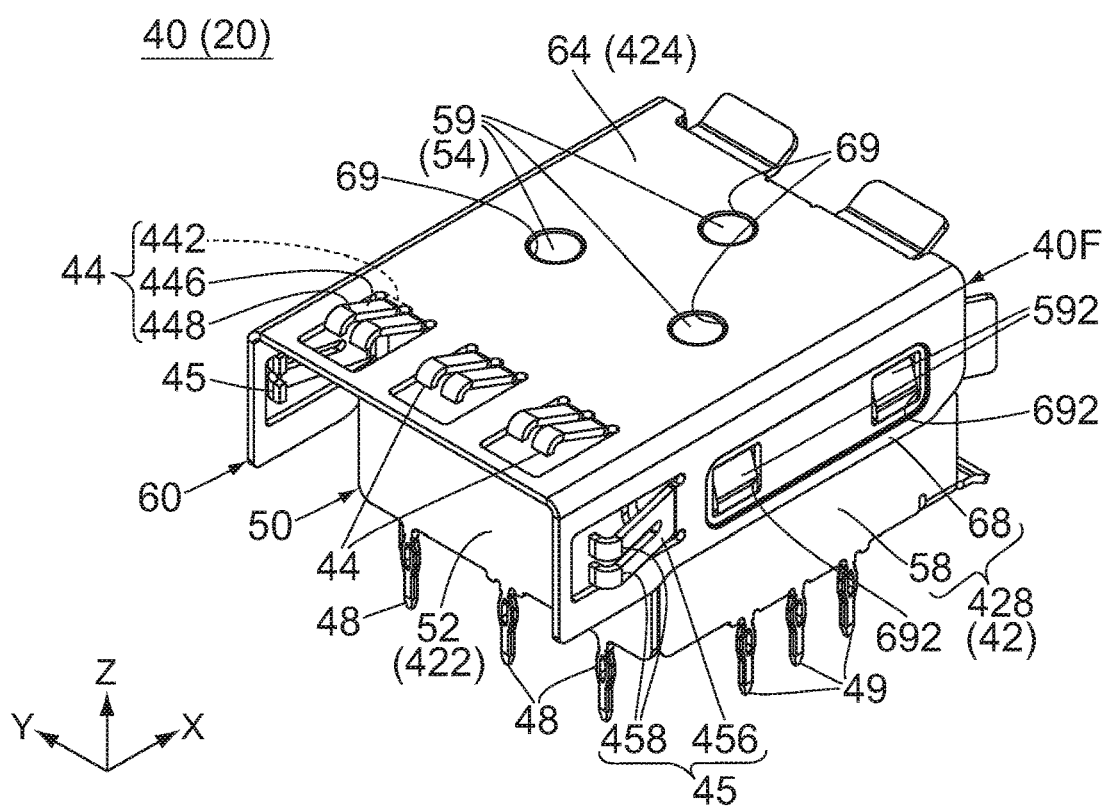
FIG. 8 is a perspective view showing a cage of the receptacle of FIG. 7, wherein a position of a start portion located between a spring portion of a contact portion and an enclosing plate is illustrated with dashed line.
Figure 9:
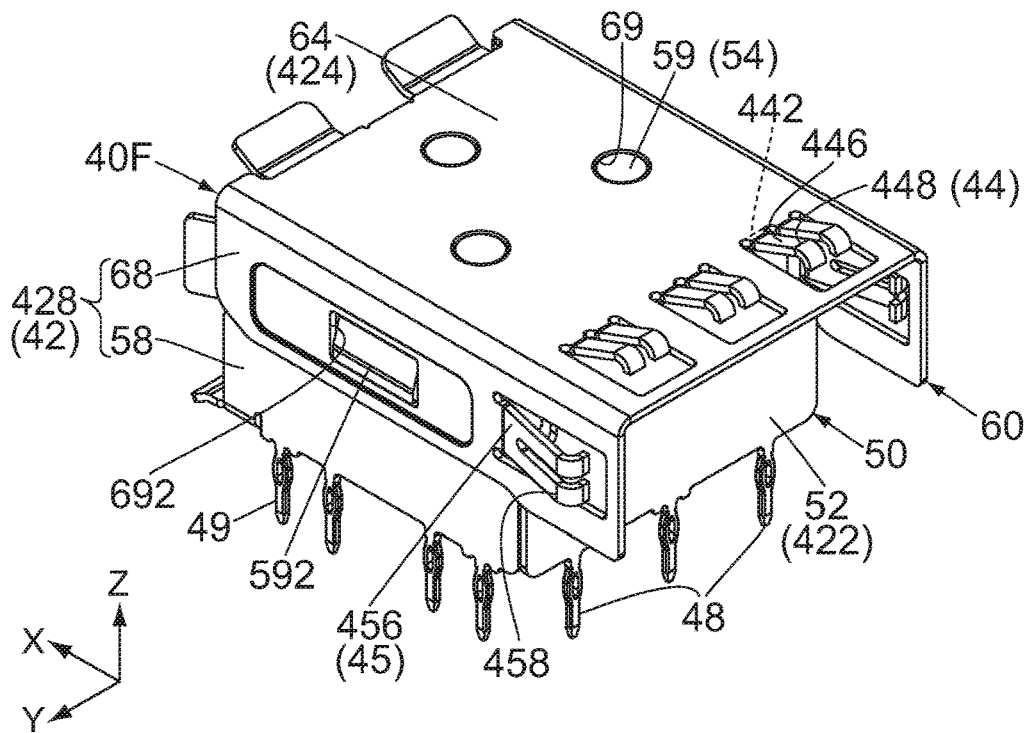
FIG. 9 is another perspective view showing the cage of FIG. 8, wherein a position of the start portion located between the spring portion of the contact portion and the enclosing plate is illustrated with dashed line.
Figure 10:
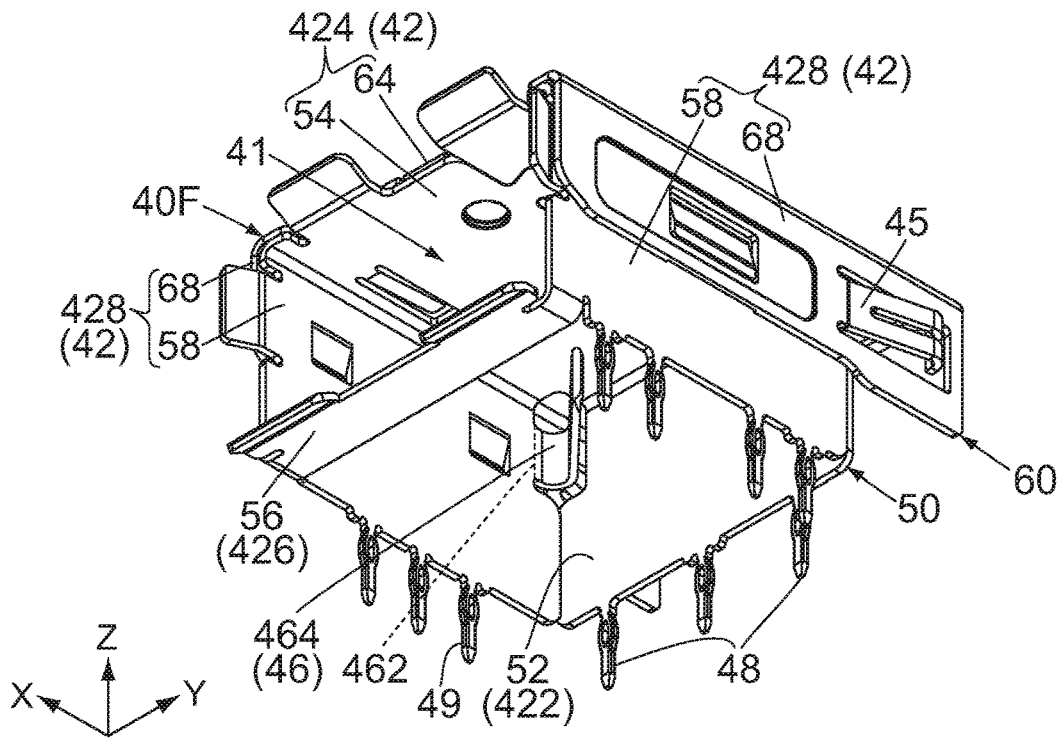
FIG. 10 is still another perspective view showing the cage of FIG. 8, wherein a position of a boundary portion located between a bent portion of an additional contact portion and the enclosing plate is illustrated with dashed line.

Referring to FIGS. 8 to 10, the enclosing plates 42 of the cage 40 of the present embodiment include a cage rear plate 422, a cage top plate 424, a cage bottom plate 426 and two cage side plates 428. The cage rear plate 422 is located behind the receiving space 41 in the X-direction and extends along the YZ-plane as a whole. The cage top plate 424 is located over, or at the positive Z-side of, the receiving space 41 in the Z-direction and extends along a horizontal plane (XY-plane) as a whole. The cage bottom plate 426 is located under, or at the negative Z-side of, the receiving space 41 in the Z-direction and extends along the XY-plane as a whole. The two cage side plates 428 are located at opposite sides of the receiving space 41 in the Y-direction, respectively. Each of the cage side plates 428 extends along a predetermined plane (XZ-plane) as a whole.

The cage 40 of the present embodiment comprises a base 50 and a cover 60. Each of the base 50 and the cover 60 is formed by bending a single metal plate. In other words, each of the base 50 and the cover 60 is a single metal plate with bends. The cover 60 is attached to an outside surface of the base 50. In the present embodiment, each of the enclosing plates 42 of the cage 40 is either a part of the base 50 or is formed of a part of the base 50 and a part of the cover 60. However, the present invention is not limited thereto. For example, the cage 40 may be formed by bending only a single metal plate. In other words, the cage 40 may be a single metal plate with bends.

Figure 14:
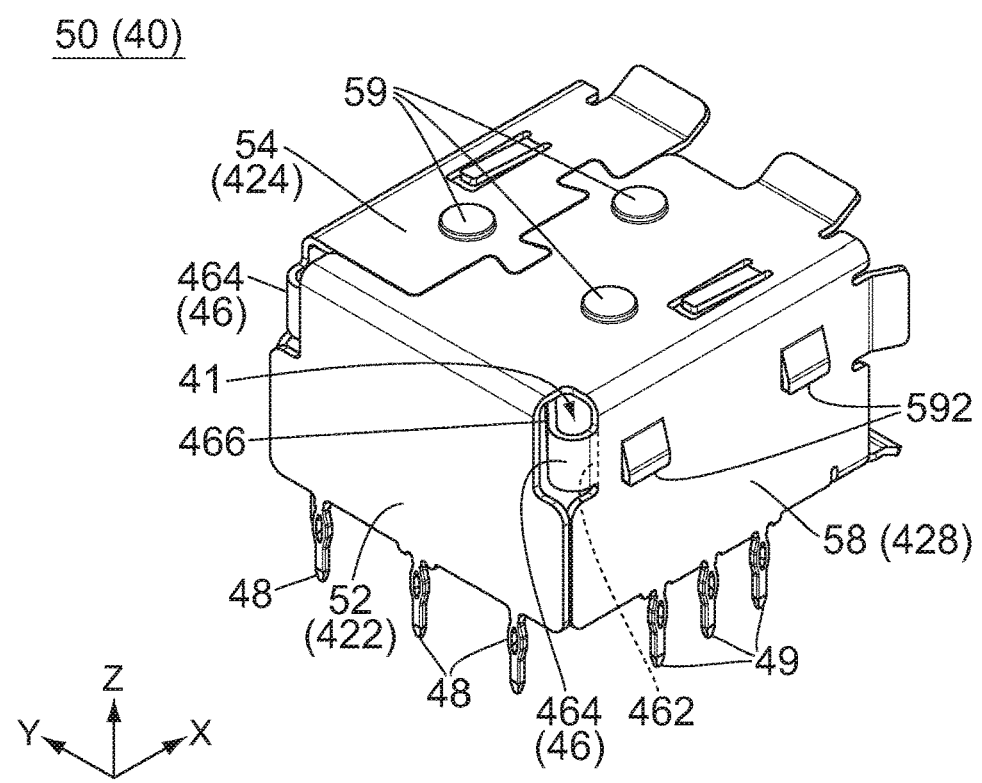
FIG. 14 is a perspective view showing a base of the cage of FIG. 8, wherein a position of the boundary portion located between the bent portion of the additional contact portion and the enclosing plate is illustrated with dashed line.
Figure 15:
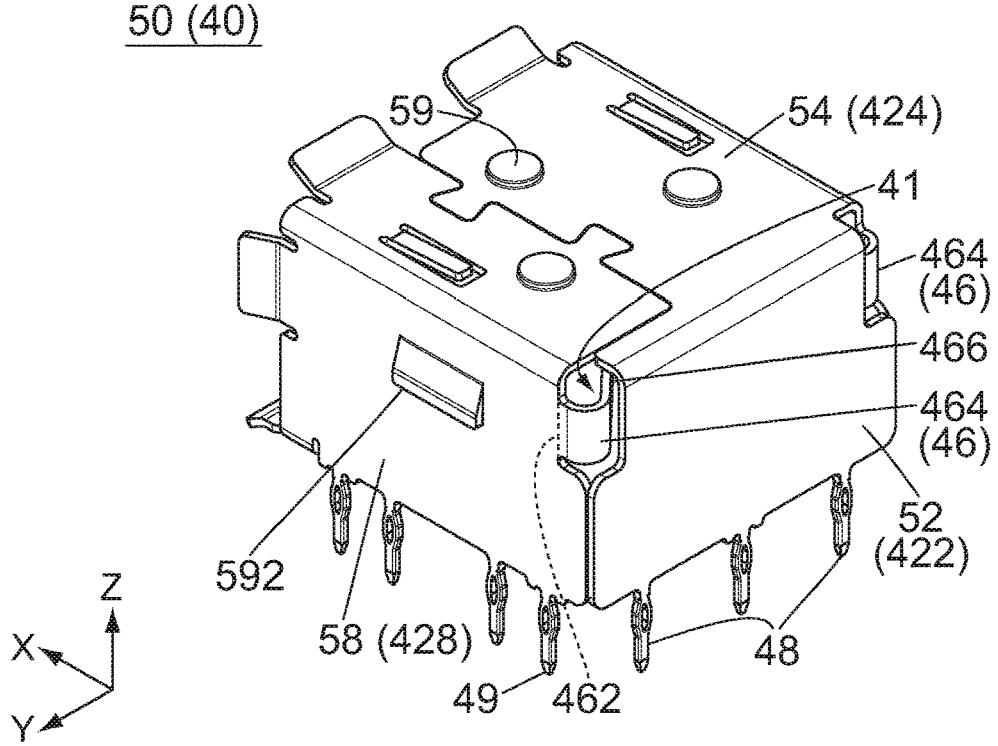
FIG. 15 is another perspective view showing the base of FIG. 14, wherein a position of the boundary portion located between the bent portion of the additional contact portion and the enclosing plate is illustrated with dashed line.

Referring to FIG. 10, the base 50 of the present embodiment has a cuboid box shape as a whole and encloses the receiving space 41. The base 50 opens downward and forward. Referring to FIGS. 10, 14 and 15, the base 50 of the present embodiment has a base rear plate 52, a base top plate 54, a base bottom plate 56 and two base side plates 58. The base rear plate 52 extends along the YZ-plane as a whole and defines a rear end of the receiving space 41. The base top plate 54 extends along the XY-plane as a whole and defines an upper end of the receiving space 41. The base bottom plate 56 extends along the XY-plane as a whole and defines a lower end, or a negative Z-side end, of the receiving space 41. Each of the base side plates 58 extends along the XZ-plane as a whole and defines one of opposite ends of the receiving space 41 in the Y-direction.

The base 50 has five bends which are two first bends, two second bends and a third bend. The first bends are formed between the base bottom plate 56 and the base side plates 58, respectively. The second bends are formed between the base top plate 54 and the base side plates 58, respectively. The third bend is formed between the base top plate 54 and the base rear plate 52. The base top plate 54 is formed with a caulked line.

Figure 13:
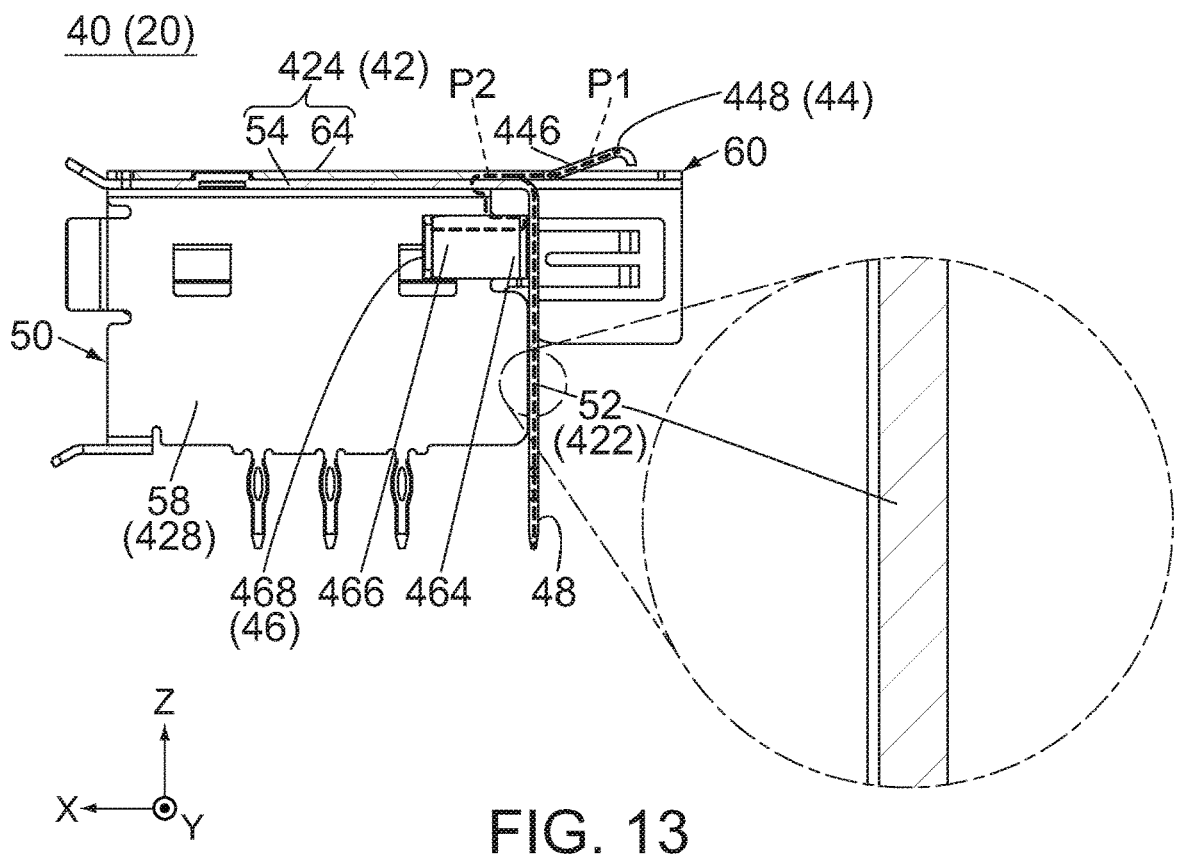
FIG. 13 is a cross-sectional view showing the cage of FIG. 12, taken along line XIII-XIII, wherein a heat-transfer path of the cage is illustrated with dashed line, and a part of the cage enclosed by chain dotted lines is enlarged and illustrated.

Referring to FIG. 13, the aforementioned bending method forms a separated part of metal plate between the base rear plate 52 and each of the base side plates 58. In other words, the base rear plate 52 is not directly connected to each of the base side plates 58. In particular, according to the present embodiment, a visible gap is formed between the base rear plate 52 and each of the base side plates 58. However, the present invention is not limited thereto. The base 50 may be formed of any metal plate that is bent in any shape, provided that a separated part of the metal plate is formed between the base rear plate 52 and each of the base side plates 58. The base rear plate 52 may be in line contact with a rear edge, or a negative X-side edge, of each of the base side plates 58.

Figure 16:
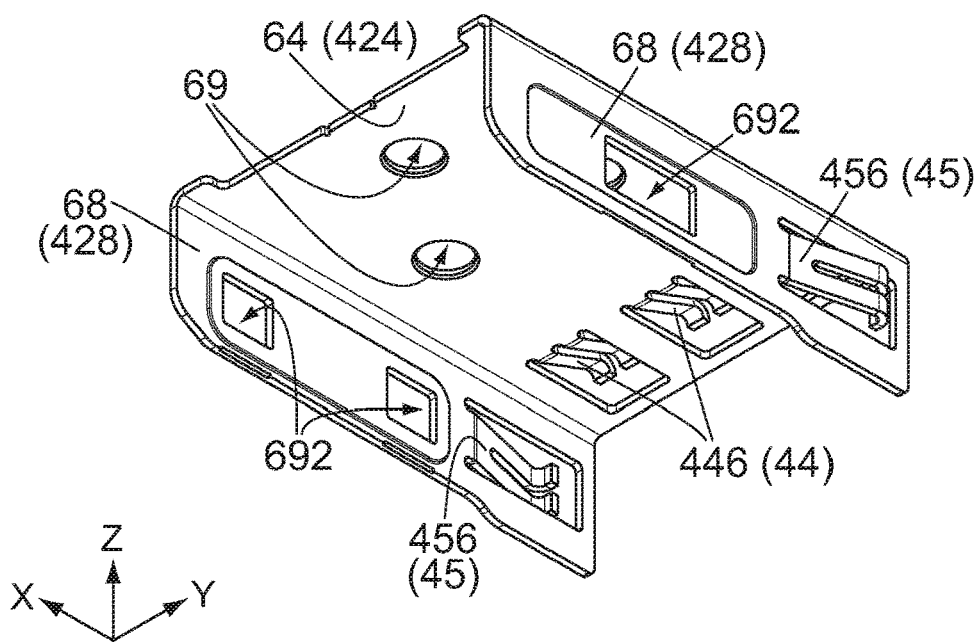
FIG. 16 is a perspective view showing a cover of the cage of FIG. 8.
Figure 17:
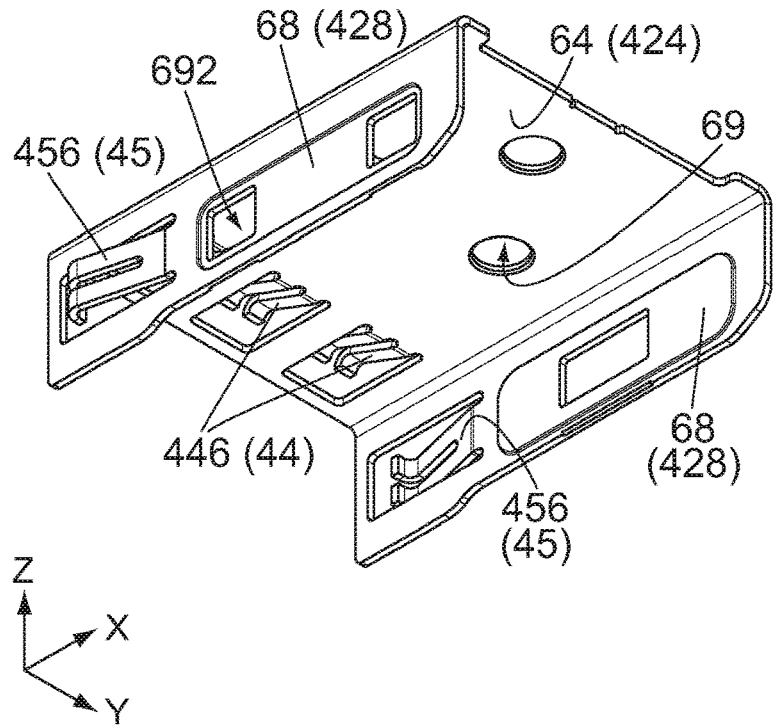
FIG. 17 is another perspective view showing the cover of FIG. 16.

Referring to FIGS. 16 and 17, the cover 60 of the present embodiment has a cover top plate 64 corresponding to the base top plate 54 (see FIG. 14) and two cover side plates 68 corresponding to the base side plates 58 (see FIG. 14), respectively. The cover top plate 64 extends along the XY-plane as a whole. Each of the cover side plates 68 extends along the XZ-plane as a whole. The cover 60 has two bends which are formed between the cover top plate 64 and the cover side plates 68, respectively. However, the present invention is not limited thereto, but the cover 60 may be formed of any metal plate that is bent in any shape. The cover 60 may have only the cover top plate 64.

As shown in FIGS. 14 and 15, the base 50 of the present embodiment has three fixation projections 59 and three engagement projections 592. Each of the fixation projections 59 is formed on the base top plate 54 and projects upward from the base top plate 54. Two of the engagement projections 592 are formed on one of the two base side plates 58, and a remaining one of the engagement projections 592 is formed on a remaining one of the two base side plates 58. Each of the engagement projections 592 protrudes outward in the Y-direction from the base side plate 58 so as to form a lower end surface which is in parallel to the XY-plane.

As shown in FIGS. 16 and 17, the cover 60 of the present embodiment has three fixation holes 69 corresponding to the fixation projections 59 (see FIG. 14) of the base 50 (see FIG. 14), respectively, and three engagement holes 692 corresponding to the engagement projections 592 (see FIGS. 14 and 15) of the base 50, respectively. Each of the fixation holes 69 is formed in the cover top plate 64 and passes through the cover top plate 64 in the Z-direction. Two of the engagement holes 692 is formed in one of the two cover side plates 68, and a remaining one of the engagement holes 692 is formed in a remaining one of the two cover side plates 68. Each of the engagement holes 692 passes through the cover side plate 68 in the Y-direction.

Referring to FIGS. 8 and 9, the cover 60 is attached to the base 50 from above. In detail, the fixation projections 59 of the base top plate 54 are inserted into and fixed to the fixation holes 69 of the cover top plate 64, respectively, so that the cover top plate 64 is attached to the base top plate 54. Each of the engagement projections 592 of the base side plates 58 is engaged with the corresponding engagement hole 692 of the cover side plate 68, so that each of the cover side plates 68 is attached to the corresponding base side plate 58. The engagement between the engagement projections 592 and the engagement holes 692 prevents the cover 60 from coming off the base 50. According to the present embodiment, the cover top plate 64 attached as described above is in secure contact with the base top plate 54. However, the present invention is not limited thereto. For example, the cover top plate 64 may be attached to the base top plate 54 via welding.

Referring to FIGS. 8 to 10, the enclosing plates 42 of the cage 40 are formed of the base 50 and the cover 60 attached to each other. In the present embodiment, the cage rear plate 422 is formed only of the base rear plate 52, and the cage bottom plate 426 is formed only of the base bottom plate 56. In contrast, the cage top plate 424 is formed of the base top plate 54 and the cover top plate 64, and each of the cage side plates 428 is formed of the base side plate 58 and the cover side plate 68 corresponding to each other. Thus, the cover top plate 64 is attached to the base top plate 54 and forms the cage top plate 424 together with the base top plate 54, and each of the cover side plates 68 is attached to the corresponding base side plate 58 and forms the cage side plate 428 together with the corresponding base side plate 58.

The enclosing plates 42 of the present embodiment are formed as described above. However, the present invention is not limited thereto. For example, the cage rear plate 422 may be formed of the base rear plate 52 and a part of the cover 60, and the cage bottom plate 426 may be formed of the base bottom plate 56 and a part of the cover 60. Thus, the cage rear plate 422 may include the base rear plate 52, and the cage bottom plate 426 may include the base bottom plate 56. Moreover, the cage top plate 424 may include the base top plate 54, and the cage side plates 428 may include the base side plates 58, respectively.

As shown in FIGS. 8 and 9, the cage 40 of the present embodiment is provided with six contact portions 44. In the present embodiment, each of the contact portions 44 is formed of a part of the cover top plate 64 which is partially cut away from the cover top plate 64 and is bent. Thus, the cover top plate 64 is provided with the six contact portions 44 each made of metal. However, the present invention is not limited thereto. For example, when the cage top plate 424 does not include the cover top plate 64, each of the contact portions 44 may be provided on the base top plate 54. The number of the contact portions 44 may be one or more.

In the present embodiment, the contact portions 44 have shapes same as one another. In detail, each of the contact portions 44 has a start portion 442, a spring portion 446 and a contact point 448. Each of the start portions 442 is located at a boundary between the contact portion 44 and the cover top plate 64. In each of the contact portions 44, the spring portion 446 extends upward and rearward from the start portion 442. In each of the contact portions 44, the contact point 448 is located in the vicinity of a rear end of the contact portion 44 and is supported by the spring portion 446. In each of the contact portions 44, the spring portion 446 is resiliently deformable, and the contact point 448 is movable in the Z-direction in accordance with resilient deformation of the spring portion 446. The contact portion 44 of the present embodiment has the aforementioned structure. However, the present invention is not limited thereto, but the structure of the contact portion 44 can be variously modified. For example, each of the contact portions 44 may have one of the spring portions 446 and two of the contact points 448.

Figure 11:
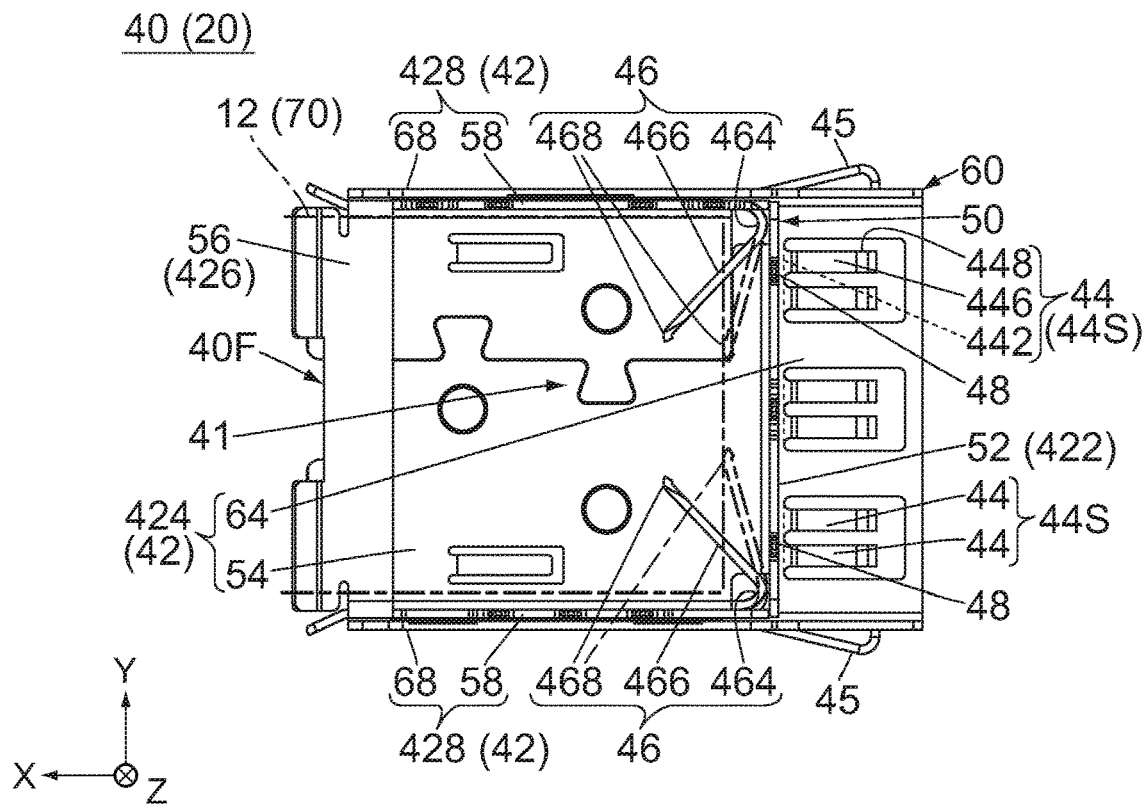
FIG. 11 is a bottom view showing the cage of FIG. 8, wherein a position of the start portion located between the spring portion of the contact portion and the enclosing plate is illustrated with dashed line, and outlines of the additional contact portions and a part of an outline of an internal module of the plug under the mated state are illustrated with chain dotted lines.

Referring to FIG. 11, each of the contact portions 44 is nearer to the cage rear plate 422 than to the front end 40F of the cage 40 in the X-direction. In the present embodiment, each of the start portions 442 is formed on a rear end portion of the cover top plate 64. In detail, each of the start portions 442 is close to the base rear plate 52 in the X-direction. The six start portions 442 are located at positions same as one another in the X-direction. However, the position of the start portion 442 is not limited to that of the present embodiment, provided that the contact portion 44 is located in the vicinity of the cage rear plate 422 in the X-direction.

As shown in FIGS. 8 and 9, the cage 40 of the present embodiment is provided with three of the terminals 48. Each of the terminals 48 extends downward from the cage rear plate 422. In the present embodiment, each of the terminals 48 is formed of a part of the base rear plate 52 which is made to extend downward. Thus, the base rear plate 52 is formed with the three terminals 48 each made of metal. However, the present invention is not limited thereto. For example, each of the terminals 48 may be a member formed separately from the cage 40. Each of the thus-formed terminals 48 may be fixed to the cage 40.

Figure 18:
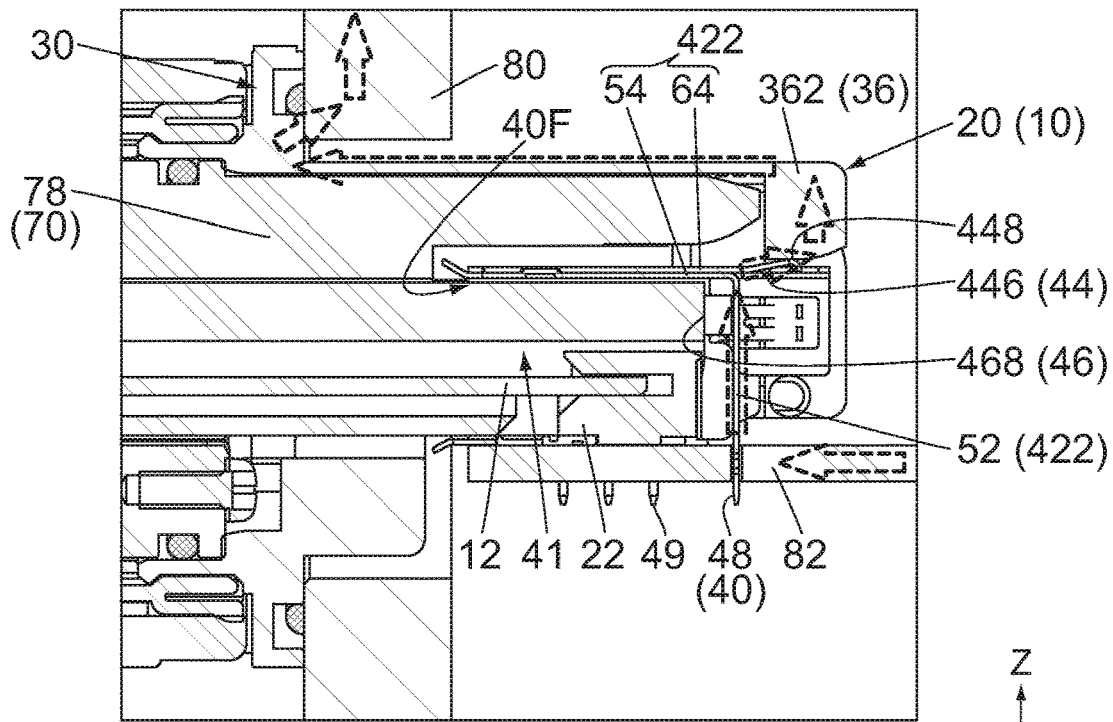
FIG. 18 is a cross-sectional view showing a heat-transfer path (see arrow of dashed line) of the receptacle of FIG. 6.

Referring to FIG. 18, the electronic device (not shown) located in the case 80 and the various electronic components (not shown) mounted on the board 82 act as heat sources which generate heat as the electronic device works. The heat generated by the heat sources is transferred to the cage 40 via the terminals 48 and the auxiliary terminals 49 connected to the ground pattern (not shown) of the board 82. If the heat transferred to the cage 40 is continuously radiated into the receiving space 41 in the cage 40, the internal module 12 of the plug 70 might work improperly or might be damaged because of the heat.

According to the present embodiment, when the shell 30 is attached to the case 80 subsequent to the installation of the cage 40 on the board 82, the protruding portion 362 of the shell 30 is located just above the cage top plate 424 with a slight distance away from the cage top plate 424 in the Z-direction. According to this arrangement, the contact point 448 of each of the contact portions 44 is brought into abutment with the protruding portion 362 and is moved downward with resilient deformation of the spring portion 446. In other words, when the cage 40 is mounted on the board 82 and the shell 30 is attached to the case 80, or under the attached state, the spring portion 446 of each of the contact portions 44 presses the contact point 448 against the protruding portion 362 of the shell 30.

According to the aforementioned structure, the heat generated in the board 82 is transferred to the shell 30 and the case 80 each having large heat capacity through the terminals 48 each made of metal, the cage 40 formed of the one or more metal plates and the contact portions 44 each made of metal. Thus, the receptacle 20 is formed with a heat-transfer path that efficiently transfers the heat from the board 82 to the case 80, so that influence of heat on the internal module 12 can be reduced. This structure allows the internal module 12 to be accommodated in either the plug 70 or the receptacle 20.

Referring to FIG. 6, under the mated state of the present embodiment, the photoelectric converter 122 of the internal module 12 is located outside the cage 40 and outside the case 80. This arrangement more reliably prevents unstable behavior of the photoelectric converter 122 even if the heat is radiated into the cage 40.

Referring to FIG. 11, according to the present embodiment, the cage 40 is provided with a plurality of the terminals 48 and a plurality of contact pairs 44S which correspond to the terminals 48, respectively. Each of contact pairs 44S includes two of the contact portions 44. In the XY-plane, the start portions 442 of each of contact pairs 44S are located at positions each of which is close to another position of the corresponding terminal 48. These structure and arrangement enable the heat to be efficiently transferred from the board 82 to the contact points 448 of the contact portions 44. However, the present invention is not limited thereto. The number and the arrangement of the terminals 48 can be variously modified. The number and the arrangement of the contact portions 44 can be variously modified.

Referring to FIG. 13, according to the present embodiment, the base top plate 54 and the cover top plate 64 of the cage top plate 424 are in close contact with each other with no gap. The base top plate 54 is connected directly to the base rear plate 52, and the cover top plate 64 is connected directly to the contact portion 44. The base top plate 54 and the cover top plate 64 are in surface contact with each other also in the vicinity of the base rear plate 52 which is connected directly to the terminals 48, so that the heat transferred to the base rear plate 52 from the terminals 48 is reliably transferred to the contact portions 44 through the base top plate 54 and the cover top plate 64. However, the present invention is not limited thereto. For example, the base top plate 54 and the cover top plate 64 may vertically face each other with a slight gap formed therebetween.

As shown in FIGS. 8 and 9, the cage 40 of the present embodiment is provided with two auxiliary contact portions 45. In the present embodiment, the two auxiliary contact portions 45 are provided so as to correspond to the two cover side plates 68, respectively. In detail, each of the auxiliary contact portions 45 is formed of a part of a rear end portion of the corresponding cover side plate 68 which is partially cut away from the cover side plate 68 and is bent. Thus, each of the cover side plates 68 is provided with one of the auxiliary contact portions 45 made of metal. However, the present invention is not limited thereto. For example, when each of the cage side plates 428 does not include the cover side plate 68, each of the auxiliary contact portions 45 may be provided on the base side plate 58. Thus, the auxiliary contact portions 45 may be provided on the cage side plates 428, respectively. The number of the auxiliary contact portions 45 of each of the cage side plates 428 may be two or more. Instead, the cage 40 may be provided with none of the auxiliary contact portions 45.

In the present embodiment, the auxiliary contact portions 45 have shapes same as each other. In detail, each of the auxiliary contact portions 45 has an auxiliary spring portion 456 and two auxiliary contact points 458. In each of the auxiliary contact portions 45, the auxiliary spring portion 456 extends rearward and outward in the Y-direction from the cover side plate 68. In each of the auxiliary contact portions 45, each of the auxiliary contact points 458 is located in the vicinity of a rear end of the auxiliary contact portion 45 and is supported by the auxiliary spring portion 456. In each of the auxiliary contact portions 45, the auxiliary spring portion 456 is resiliently deformable, and the auxiliary contact points 458 are movable in the Y-direction in accordance with resilient deformation of the auxiliary spring portion 456. The auxiliary contact portion 45 of the present embodiment has the aforementioned structure. However, the present invention is not limited thereto, but the structure of the auxiliary contact portion 45 can be variously modified. For example, each of the auxiliary contact portions 45 may have only one of the auxiliary contact points 458.

As shown in FIGS. 8 and 9, the cage 40 of the present embodiment is provided with seven of the auxiliary terminals 49. Each of the auxiliary terminals 49 extends downward from the cage side plate 428. In the present embodiment, each of the auxiliary terminals 49 is formed of a part of the base side plate 58 which is made to extend downward. Thus, each of the base side plates 58 is proved with a plurality of the auxiliary terminals 49 each made of metal. However, the present invention is not limited thereto. For example, each of the auxiliary terminals 49 may be a member formed separately from the cage 40. Each of the thus-formed auxiliary terminals 49 may be fixed to the cage 40.

Referring to FIG. 2, according to the present embodiment, when the shell 30 is attached to the case 80 subsequent to the installation of the cage 40 on the board 82, the protruding portion 362 of the shell 30 is located outward of each of the cage side plates 428 in the Y-direction with a slight distance from each of the cage side plates 428 in the Y-direction. According to this arrangement, when the cage 40 is mounted on the board 82 and the shell 30 is attached to the case 80, or under the attached state, the auxiliary spring portion 456 of each of the auxiliary contact portions 45 presses the auxiliary contact points 458 against the protruding portion 362 of the shell 30.

Figure 12:
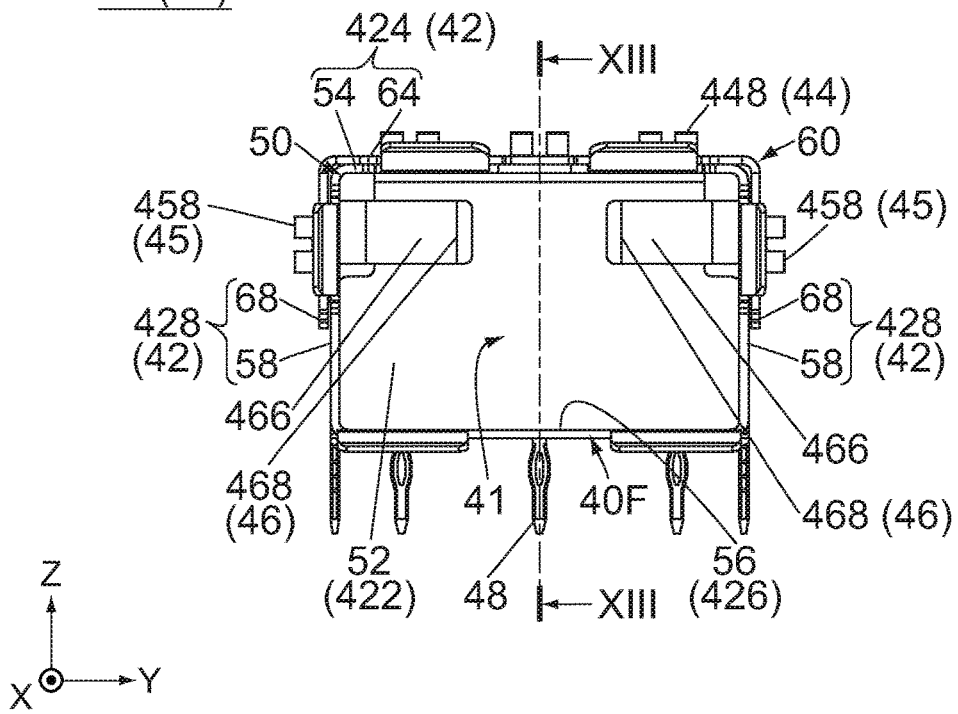
FIG. 12 is a front view showing the cage of FIG. 8.

According to the aforementioned structure, the auxiliary contact portions 45 work as auxiliary parts that transfer the heat generated in the board 82 to the shell 30 together with the terminals 48 and the auxiliary terminals 49. However, referring to FIG. 12, each of the cover side plates 68 is apart from the corresponding base side plate 58 outward in the Y-direction. In addition, each of the auxiliary terminals 49 is connected directly to the base side plate 58, while each of the auxiliary contact portions 45 is connected directly to the cover side plate 68. This structure lowers heat transfer efficiency for transferring the heat from the board 82 to the shell 30 through the auxiliary contact portions 45 in comparison with heat transfer efficiency for transferring the heat from the board 82 to the shell 30 through the contact portions 44. In addition, referring to FIG. 18, the auxiliary terminals 49 are further apart from the heat sources in comparison with the terminals 48, so that the heat transferred to the auxiliary terminals 49 is relatively small. Therefore, from a view point of efficient transfer of the heat from the board 82 to the shell 30, the auxiliary terminals 49 and the auxiliary contact portions 45 do not need to be provided.

Referring to FIGS. 10 to 13, the cage 40 of the present embodiment is provided with two additional contact portions 46. In the present embodiment, the two additional contact portions 46 are provided so as to correspond to the two cage side plates 428, respectively. In detail, each of the additional contact portions 46 is formed of a part of a rear edge of the base side plate 58 of the corresponding cage side plate 428 which is made to extend rearward and is bent forward. Thus, each of the base side plates 58 is provided with the additional contact portion 46 made of metal. However, the present invention is not limited thereto. For example, each of the additional contact portions 46 may be provided on the base top plate 54. Thus, each of the additional contact portions 46 may be provided on at least one of the cage top plate 424 and the cage side plates 428. The number of the additional contact portions 46 of each of the cage side plates 428 may be one or more. Instead, the cage 40 may be provided with none of the additional contact portions 46.

In the present embodiment, the additional contact portions 46 have shapes same as each other. Each of the additional contact portions 46 has a boundary portion 462, a bent portion 464, an additional spring portion 466 and an additional contact point 468.

Referring to FIGS. 10, 14 and 15, in the present embodiment, each of the boundary portions 462 is a part of the rear edge of the base side plate 58 and is located at a boundary between the bent portion 464 and the base side plate 58. In other words, each of the boundary portions 462 is located at the rear edge of the base side plate 58. Each of the bent portions 464 extends from the boundary portion 462. Thus, each of the bent portions 464 is connected directly to the base side plate 58. However, the present invention is not limited thereto. For example, when each of the additional contact portions 46 is provided on the base top plate 54, each of the boundary portions 462 may be located at a rear edge of the base top plate 54. With this structure, each of the bent portions 464 is connected directly to the base top plate 54.

Referring to FIG. 11, each of the bent portions 464 of the present embodiment has an arc-like shape protruding rearward in the XY-plane. Each of the thus-shaped bent portions 464 has a rear end which is close to the base rear plate 52. In each of the additional contact portions 46, the additional spring portion 466 extends forward and inward of the cage 40 from the bent portion 464. In each of the additional contact portions 46, the additional contact point 468 is located in the vicinity of a front end of the additional contact portion 46 and is supported by the additional spring portion 466. In each of the additional contact portions 46, the additional spring portion 466 is resiliently deformable, and the additional contact point 468 is movable in the X-direction in accordance with resilient deformation of the additional spring portion 466.

While the plug 70 is mated with the receptacle 20, the internal module 12 of the plug 70 is inserted into the receiving space 41 of the cage 40 to be brought into abutment with the additional contact points 468 of the additional contact portions 46. The internal module 12 is received in the receiving space 41 while resiliently deforming the additional spring portions 466 to move the additional contact points 468 rearward. Under the mated state, the thus-deformed additional spring portions 466 press the additional contact points 468 against the internal module 12. Thus, the additional contact portion 46 of the present embodiment is a kick-out spring and has a structure for pushing the internal module 12 forward. However, the present invention is not limited thereto. For example, the additional contact portion 46 should be provided as necessary and may have any structure depending on its usage.

Referring to FIG. 18, under the mated state of the present embodiment, the internal module 12 is in contact with the additional contact points 468 of the additional contact portions 46 of the cage 40. According to this structure, the heat transferred to the cage 40 from the board 82 might be transferred to the internal module 12 through the additional contact portions 46.

Referring to FIG. 13, according to the present embodiment, the heat transferred to the terminals 48 is transferred to the contact points 448 of the contact portions 44 through a first creeping path P1 and is also transferred to the additional contact points 468 of the additional contact portions 46 through a second creeping path P2. Each of the first creeping path P1 and the second creeping path P2 extends along the one or more metal plates that form the cage 40. The first creeping path P1 is a continuous path extending between the terminal 48 and the contact point 448 of the contact portion 44. The first creeping path P1 of the present embodiment extends from the terminal 48 to the contact point 448 through the base rear plate 52 of the cage rear plate 422, the base top plate 54 and the cover top plate 64 of the cage top plate 424 and the spring portion 446 of the contact portion 44 in this order. The second creeping path P2 is a continuous path extending between the terminal 48 and the additional contact point 468 of the additional contact portion 46. The second creeping path P2 extends from the terminal 48 to the additional contact point 468 through the base rear plate 52 of the cage rear plate 422, the base top plate 54 of the cage top plate 424, the base side plate 58 of the cage side plate 428 and the additional spring portion 466 of the additional contact portion 46 in this order.

Referring to FIG. 13, the first creepage path P1 is from the terminal 48 to the contact point 448 of the contact portion 44 along at least one of the metal plates that form the cage 40. The second creepage path P2 is from the terminal 48 to the additional contact point 468 along at least one of the metal plates that form the cage 40. A path distance DP1, or a length of the first creepage path P1, is shorter than another path distance DP2, or another length of the second creepage path P2. According to this structure, the heat transferred to the cage 40 is almost completely transferred to the contact portions 44. Referring to FIG. 18, according to the present embodiment, the heat is efficiently transferred to the case 80 even when the additional contact portions 46 are provided, so that damage or unstable behavior of the internal module 12 can be prevented.

Referring to FIG. 13, in the present embodiment, the cage top plate 424 that is connected directly to the cage rear plate 422 is provided with the contact portions 44. In contrast, the cage side plate 428 that is provided with none of the contact portions 44 is provided with the additional contact portion 46. Referring to FIG. 10, the cage side plate 428, or the enclosing plate 42 that is provided with the additional contact portion 46, has no part that is located rearward of the boundary portion 462 between the bent portion 464 and the enclosing plate 42 and that is connected to the cage rear plate 422. In other words, the rear part of the cage side plate 428, which is located rearward of the boundary portion 462, is entirely apart from the cage rear plate 422. Thus, the cage side plate 428 is not directly connected to the cage rear plate 422. Referring to FIG. 11, according to this structure, the heat-transfer path between the cage rear plate 422 provided with the terminals 48 and the internal module 12 is made long. Referring to FIG. 18, with this structure, the heat of the board 82 is further easily transferred to the case 80, so that heat-transfer efficiency to the case 80 is improved. Thermal analysis simulation has revealed that the heat-transfer efficiency of the heat to the case 80 is improved because of difference between the lengths of these heat-transfer paths.

From a view point of efficient transfer of the heat to the case 80 from the board 82 under a situation where the additional contact portion 46 is provided, the arrangement of the contact portions 44 and the additional contact portions 46 is not limited to that of the present embodiment.

For example, referring to FIG. 13, the contact portion 44 may be provided on the cage rear plate 422. More specifically, the contact portion 44 may be provided on at least one of the cage rear plate 422 and the enclosing plate 42 that is connected directly to the cage rear plate 422. The additional contact portion 46 may be provided on at least one of the enclosing plates 42, the at least one of the enclosing plates 42 being one of the cage top plate 424 and the cage side plates 428 and being not provided with the contact portion 44. The bent portion 464 of the additional contact portion 46 may be connected directly to the enclosing plate 42 regardless of that the additional contact portion 46 is provided on any of the enclosing plates 42. Referring to FIG. 11, the auxiliary contact portion 45 may be provided on the enclosing plate 42 that is provided with the additional contact portion 46. Referring to FIG. 10, the enclosing plate 42 that is provided with the additional contact portion 46 is preferred to have no part that is located rearward of the boundary portion 462 between the bent portion 464 and the enclosing plate 42 and that is connected to the cage rear plate 422.

Referring to FIG. 1, the connector assembly 10 and the receptacle 20 according to the present embodiment can be further variously modified in addition to the already described various modifications. Hereafter, explanation will be made about modifications of the connector assembly 10 and the receptacle 20 and, in particular, about difference from the connector assembly 10 and the receptacle 20.

Figure 19:
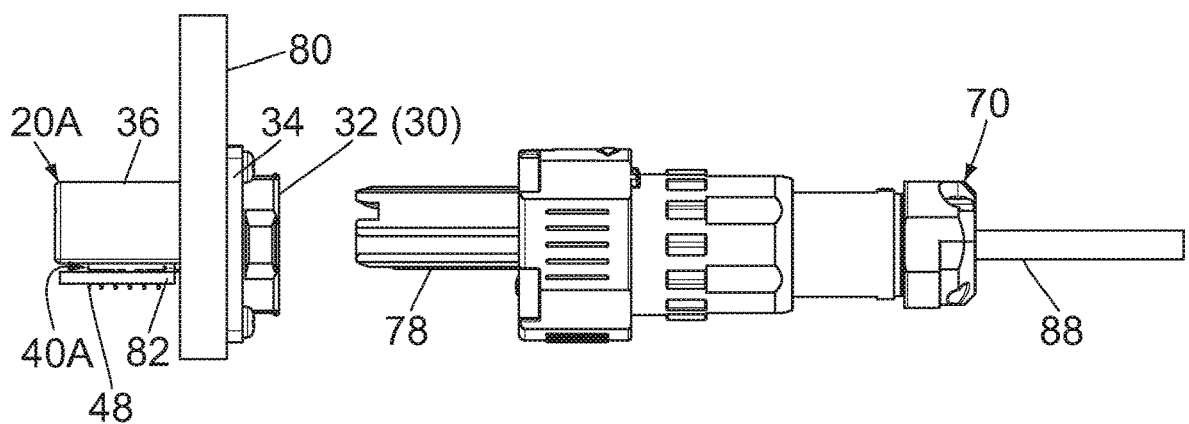
FIG. 19 is a side view showing a modification of the connector assembly of FIG. 1, wherein a receptacle of the connector assembly is attached to the case and the board, and a plug of the connector assembly is attached to the cable.

Referring to FIG. 19, a connector assembly 10A according to a modification of the connector assembly 10 (see FIG. 1) comprises the plug 70 and a receptacle 20A mateable with each other. The plug 70 is identical to the plug 70 of the connector assembly 10 and comprises the internal module 12 (see FIG. 4). Thus, the connector assembly 10A accommodates the internal module 12 therein.

Figure 20:
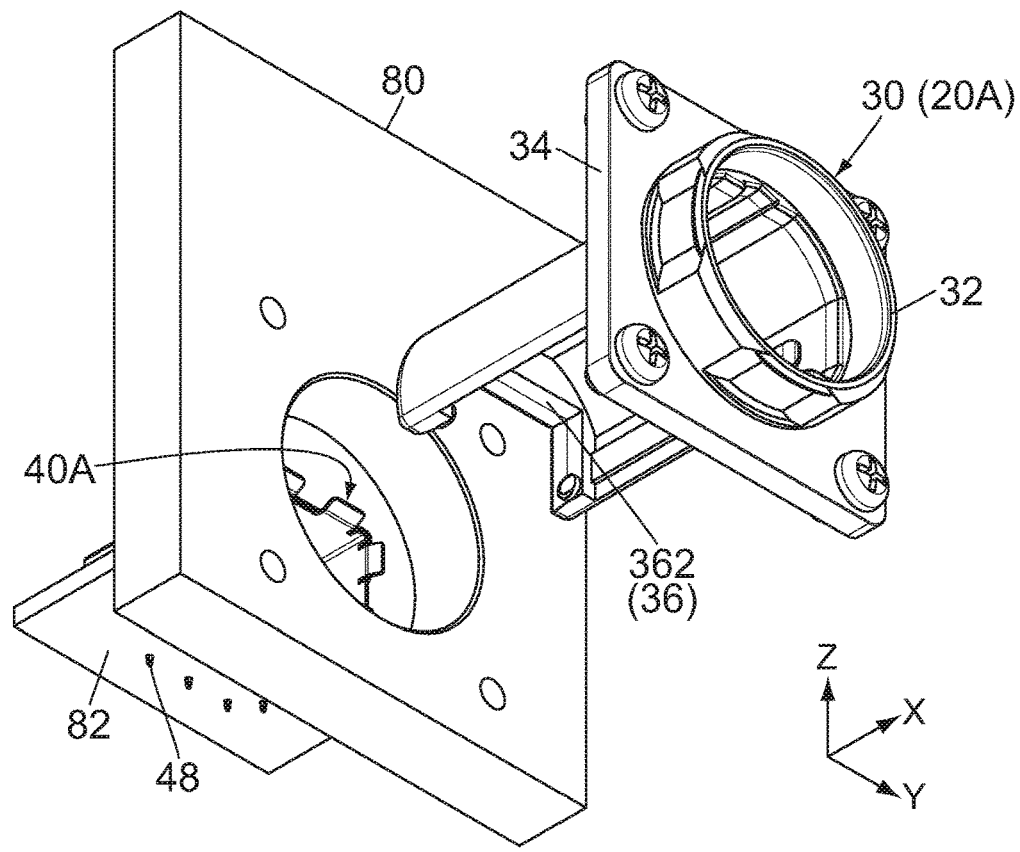
FIG. 20 is an exploded, perspective view showing the receptacle of FIG. 19.

Referring to FIG. 20, the receptacle 20A has a structure different from that of the receptacle 20 (see FIG. 1) of the connector assembly 10 (see FIG. 1). More specifically, the receptacle 20A comprises the shell 30 same as that of the receptacle 20 and a cage 40A made of one or more metal plates but is different from the cage 40 (see FIG. 1) of the receptacle 20. The shell 30 is attachable to the case 80 made of metal, and the cage 40A is mountable on the board 82 arranged in the case 80.

Figure 22:
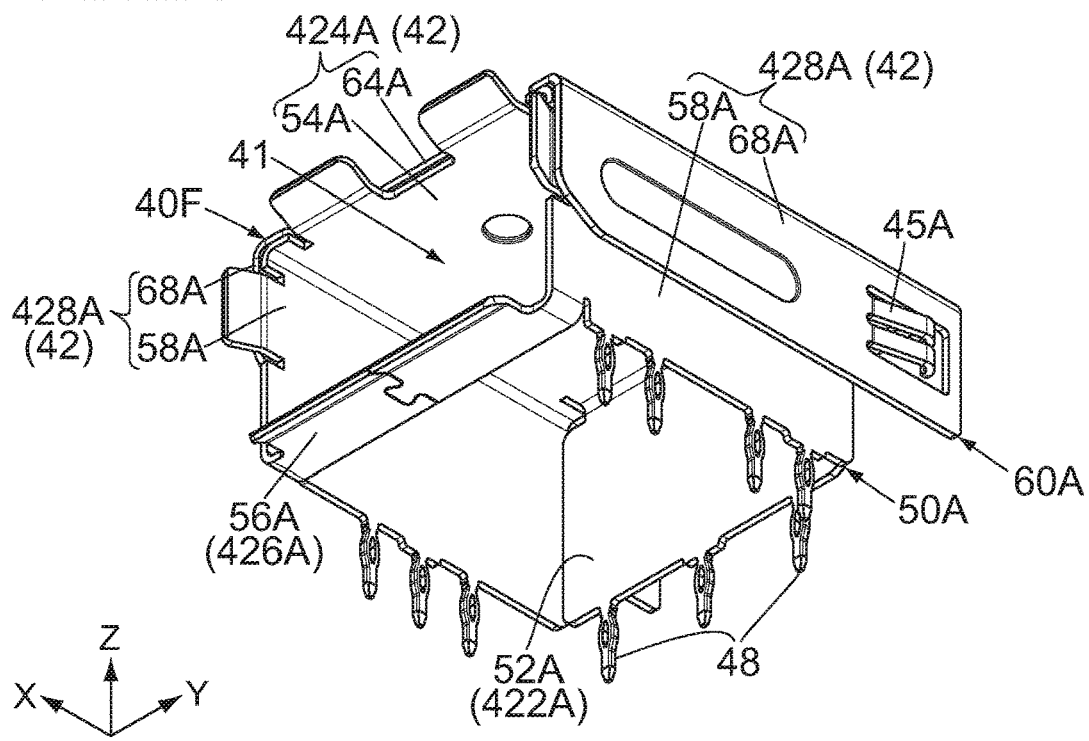
FIG. 22 is another perspective view showing the cage of FIG. 21.
Figure 23:
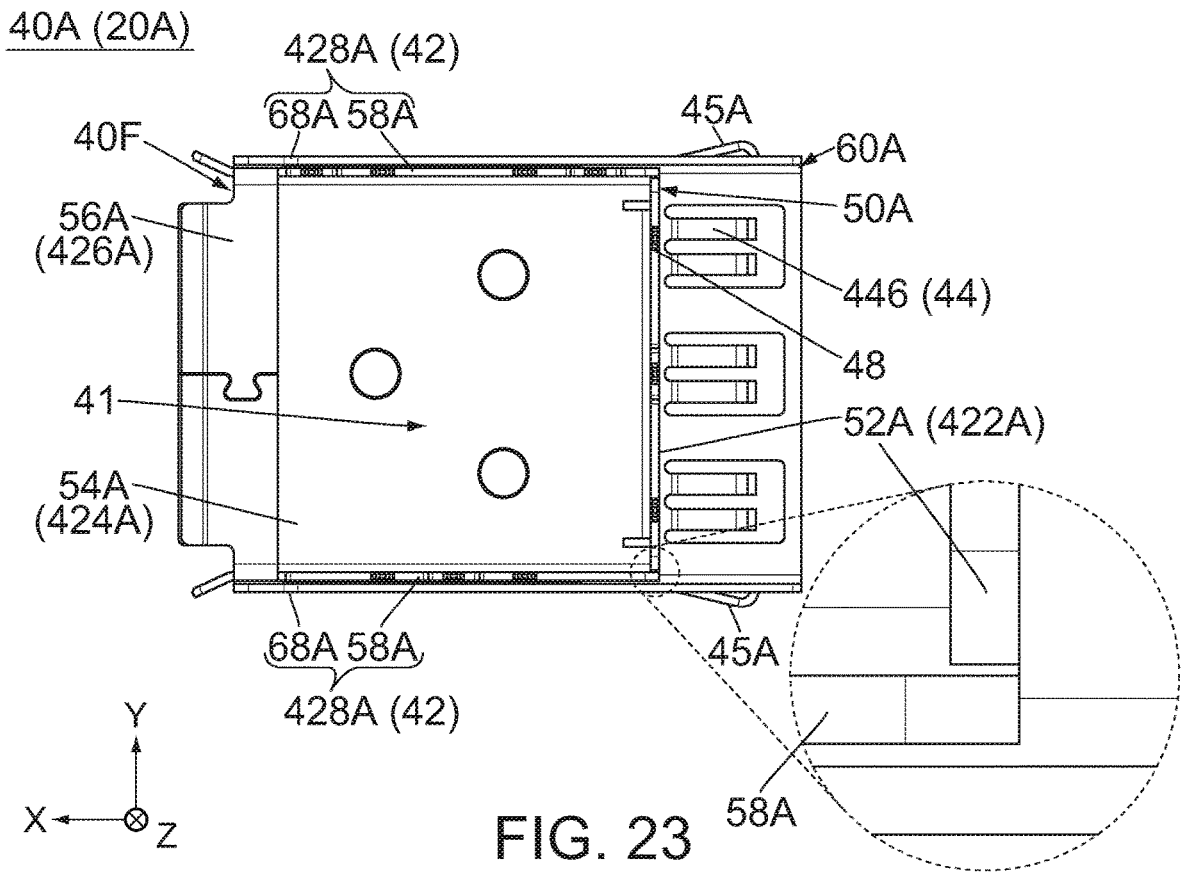
FIG. 23 is a bottom view showing the cage of FIG. 21, wherein a part of the cage enclosed by dashed line is enlarged and illustrated.
Figure 24:
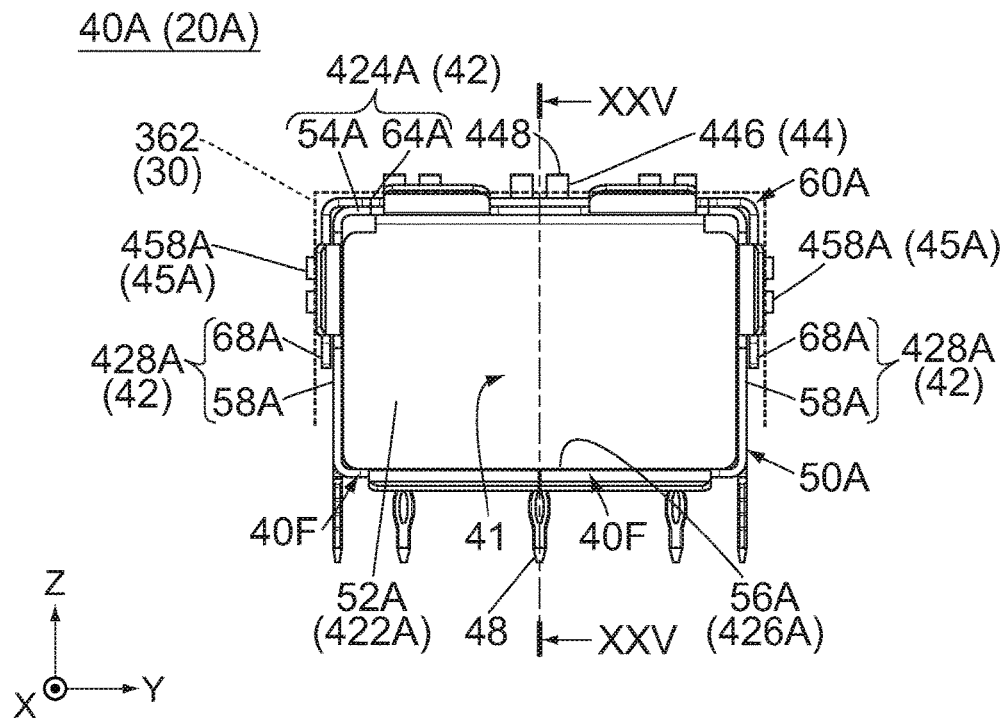
FIG. 24 is a front view showing the cage of FIG. 21, wherein a position of a protruding portion of a shell under an attached state is illustrated with dashed line.
Figure 25:
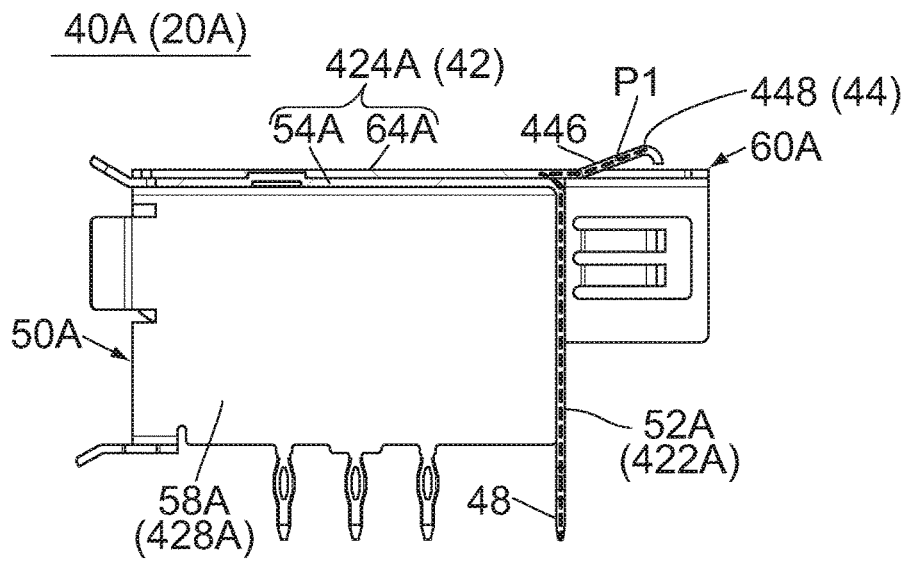
FIG. 25 is a cross-sectional view showing the cage of FIG. 24, taken along line XXV-XXV, wherein a heat-transfer path of the cage is illustrated with dashed line.

Referring to FIGS. 22 to 24, the cage 40A has the receiving space 41 and a plurality of the enclosing plates 42. The receiving space 41 opens at the front end 40F of the cage 40A in the front-rear direction (X-direction) and accommodates the internal module 12 (see FIG. 4) under a mated state where the plug 70 (see FIG. 19) and the receptacle 20A are mated with each other.

The enclosing plates 42 includes a cage rear plate 422A, a cage top plate 424A, a cage bottom plate 426A and two cage side plates 428A. The cage rear plate 422A is located behind the receiving space 41 in the X-direction. The cage top plate 424A is located over the receiving space 41 in the upper-lower direction (Z-direction). The cage bottom plate 426A is located under the receiving space 41 in the Z-direction. The two cage side plates 428A are located at opposite sides of the receiving space 41 in the lateral direction (Y-direction), respectively.

Referring to FIGS. 21 to 25, the cage 40A of the present modification comprises a base 50A and a cover 60A which are different from the base 50 and the cover 60 of the cage 40 (see FIG. 8), respectively. Each of the base 50A and the cover 60A is a single metal plate with bends.

The base 50A has a base rear plate 52A, a base top plate 54A, a base bottom plate 56A and two base side plates 58A. The base 50A has five bends which are two first bends, two second bends and a third bend. The first bends are formed between the base bottom plate 56A and the base side plates 58A, respectively. The second bends are formed between the base top plate 54A and the base side plates 58A, respectively. The third bend is formed between the base top plate 54A and the base rear plate 52A. The base bottom plate 56A is formed with a caulked line. The cover 60A has a cover top plate 64A and two cover side plates 68A. The cover 60A has two bends which are formed between the cover top plate 64A and the cover side plates 68A, respectively.

Figure 21:
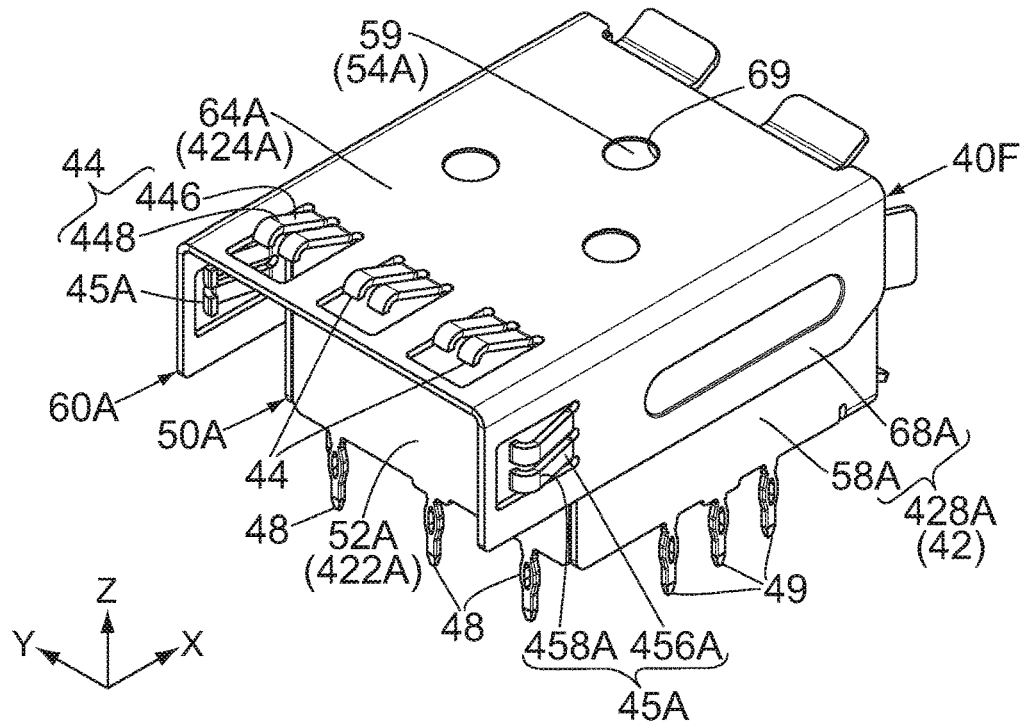
FIG. 21 is a perspective view showing a cage of the receptacle of FIG. 20.

Referring to FIG. 21, the cover top plate 64A is provided with the six contact portions 44 same as those of the cage 40 (see FIG. 8). Each of the cover side plates 68A is provided with two auxiliary contact portions 45A different from the auxiliary contact portions 45 (see FIG. 8) of the cage 40. Each of the auxiliary contact portions 45A has an auxiliary spring portion 456A and an auxiliary contact point 458A. Each of the auxiliary spring portions 456A is connected directly to the cover side plate 68A similarly to the auxiliary spring portions 456 illustrated in FIG. 8 and is resiliently deformable. Each of the auxiliary contact points 458A is supported by the auxiliary spring portion 456A and is movable in the Y-direction.

In the present modification, the fixation projections 59 of the base top plate 54A are inserted into and fixed to the fixation holes 69 of the cover top plate 64A, respectively. As a result, the cover top plate 64A is attached to the base top plate 54A and forms the cage top plate 424A together with the base top plate 54A. Each of the cover side plates 68A is located outward of the corresponding base side plate 58A in the Y-direction and forms the cage side plate 428A together with the corresponding base side plate 58A. The cage rear plate 422A includes the base rear plate 52A. Referring to FIG. 22, the cage bottom plate 426A includes the base bottom plate 56A.

Referring to FIGS. 21 and 22, the cage 40A is provided with the three terminals 48 each made of metal. Each of the terminals 48 extends downward from the cage rear plate 422A. Referring to FIG. 21, the cage 40A is provided with the six contact portions 44 each made of metal. Each of the contact portions 44 is nearer to the front end 40F of the cage 40A than to the cage rear plate 422A in the X-direction. Each of the contact portions 44 has the spring portion 446 and the contact point 448. Referring to FIGS. 19 and 20, when the cage 40A is mounted on the board 82 and the shell 30 is attached to the case 80, the shell 30 covers the cage 40A, and each of the terminals 48 is fixed to the board 82. Referring to FIG. 24, under this state, each of the spring portions 446 of the contact portions 44 presses the contact point 448 against the shell 30.

Referring to FIG. 19, according to the present modification, similarly to the previously described embodiment, heat generated in the board 82 is transferred to the shell 30 and the case 80 each having large heat capacity through the terminals 48 each made of metal, the cage 40A formed of the one or more metal plates and the contact portions 44 each made of metal (see FIG. 24). Thus, the receptacle 20A is formed with a heat-transfer path that efficiently transfers the heat from the board 82 to the case 80.

Comparing FIGS. 22 to 25 with FIG. 11, the cage 40A of the present modification is provided with none of the additional contact portions 46 that are brought into contact with the internal module 12 under the mated state. According to the present modification, influence of heat on the internal module 12 (see FIG. 11) can be further reduced even in comparison with the previously described embodiment. Referring to FIG. 23, in the present modification, the base rear plate 52A has two side edges located at opposite sides thereof in the Y-direction. The side edges are apart from the two base side plates 58A, respectively. According to the present modification, even if the side edges of the base rear plate 52A are in contact with the base side plates 58A, the internal module 12 (see FIG. 11) is hardly influenced by the heat.

Figure 26:
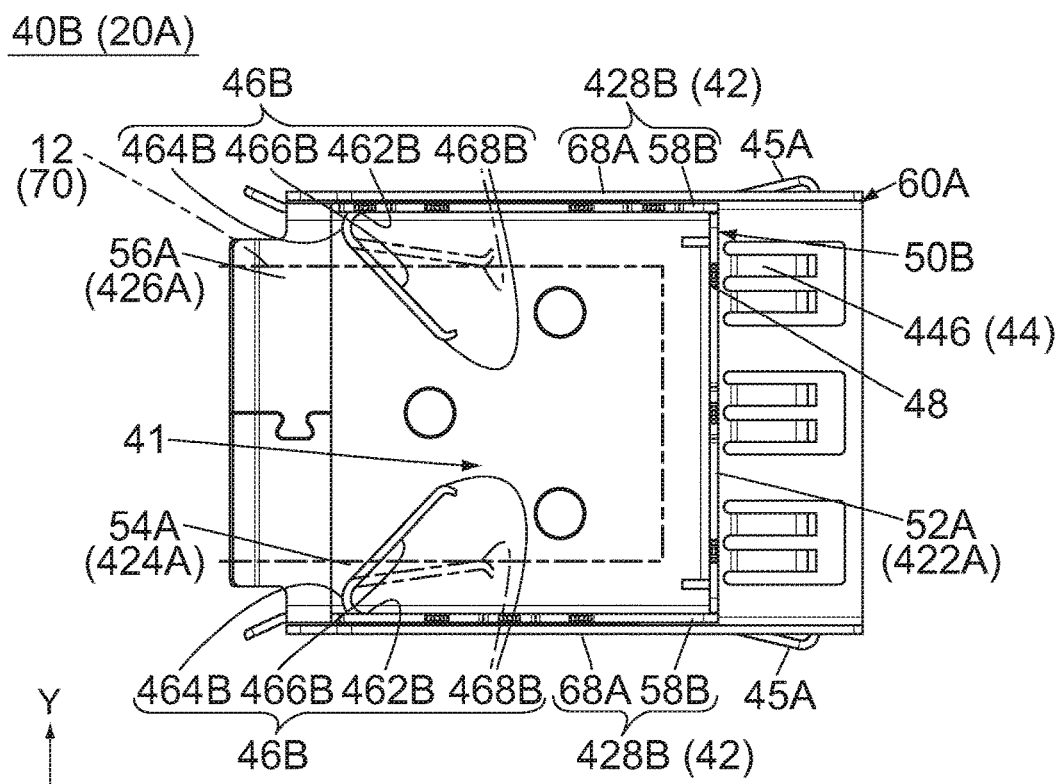
FIG. 26 is a bottom view showing a modification of the cage of FIG. 23, wherein outlines of additional contact portions and a part of an outline of an internal module of the plug under a mated state are illustrated with chain dotted lines.

Referring to FIG. 26, the illustration shows a cage 40B which is a modification of the cage 40A (see FIG. 23). The cage 40B is provided with two additional contact portions 46B each made of metal. The cage 40B has two cage side plates 428B which are provided with the two additional contact portions 46B, respectively. The cage 40B has a structure similar to that of the cage 40A except for this difference. For example, the contact portion 44 of the cage 40B is provided on at least one of the enclosing plates 42.

The cage 40B of the present modification comprises a base 50B different from the base 50A of the cage 40A (see FIG. 23) and the cover 60A same as that of the cage 40A. The base 50B has two base side plates 58B. Each of the base side plates 58B is provided with the additional contact portion 46B. In other words, each of the additional contact portions 46B is provided on the base side plate 58B of the cage side plate 428B. In the present modification, each of the additional contact portions 46B is formed of a part of a front end of the base side plate 58B which is made to extend forward and is bent rearward. However, the present invention is not limited thereto, but each of the additional contact portions 46B can be formed in various ways. Each of the additional contact portions 46B may be provided on at least one of the cage top plate 424A and the cage side plates 428B.

Each of the additional contact portions 46B has a bent portion 464B, an additional spring portion 466B and an additional contact point 468B. Each of the bent portions 464B is connected directly to the enclosing plate 42, or the base side plate 58B of the cage side plate 428B. Each of the additional contact portions 46B has a boundary portion 462B formed between the bent portion 464B and the enclosing plate 42. Each of the additional spring portions 466B extends rearward and inward of the cage 40B from the bent portion 464B and is resiliently deformable. Each of the additional contact points 468B is supported by the additional spring portion 466B and is movable in the Y-direction. Each of the additional spring portions 466B presses the additional contact point 468B against the internal module 12 under the mated state.

A distance between the cage rear plate 422A and each of the boundary portions 462B in the X-direction is longer than another distance between the cage rear plate 422A and each of the additional contact points 468B in the X-direction. Thus, each of the boundary portions 462B is far apart from the cage rear plate 422A. According to this arrangement, although the additional contact portions 46B are provided, the internal module 12 is hardly influenced by heat.

Referring to FIGS. 27 to 30, the illustration shows a receptacle 20C which is a modification of the receptacle 20 (see FIG. 1). The receptacle 20C works as the receptacle 20C of a connector assembly (not shown) which further comprises a plug (not shown) mateable with the receptacle 20C.

Figure 28:
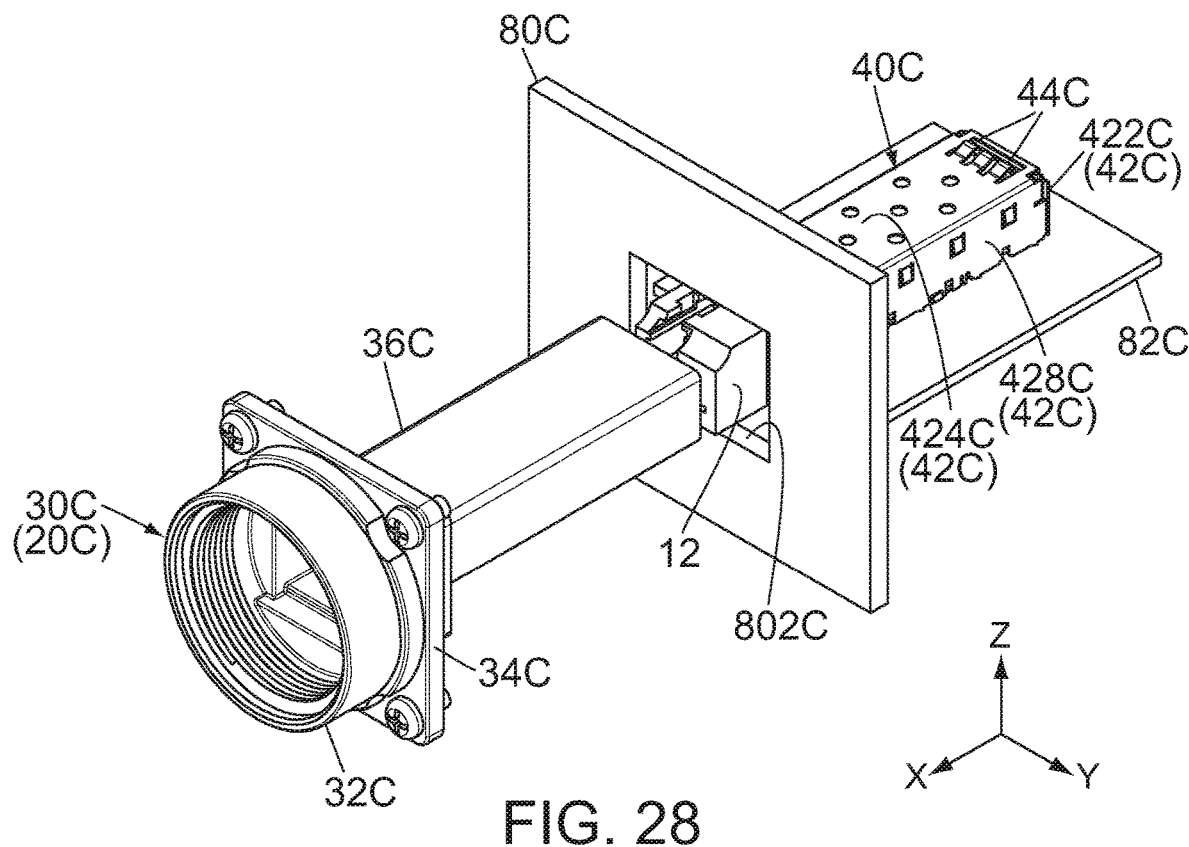
FIG. 28 is an exploded, perspective view showing the receptacle of FIG. 27.
Figure 29:
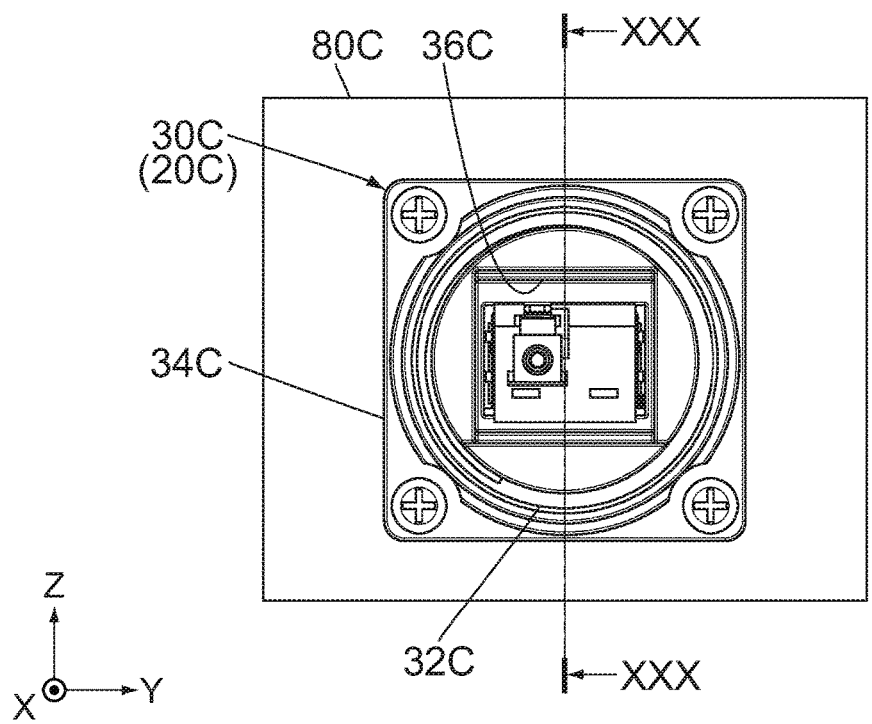
FIG. 29 is a front view showing the receptacle of FIG. 27.
Figure 30:
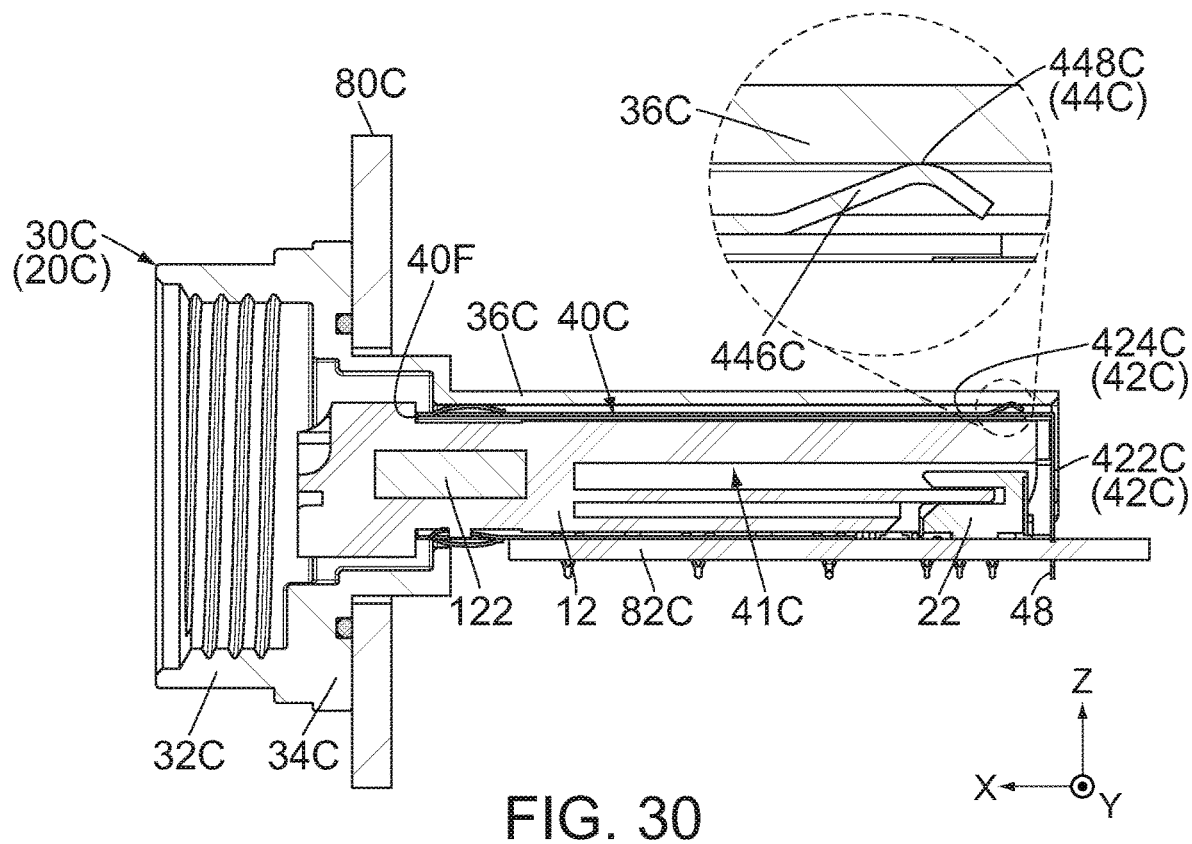
FIG. 30 is a cross-sectional view showing the receptacle of FIG. 29, taken along line XXX-XXX, wherein a part of the receptacle enclosed by dashed line is enlarged and illustrated.
Figure 31:
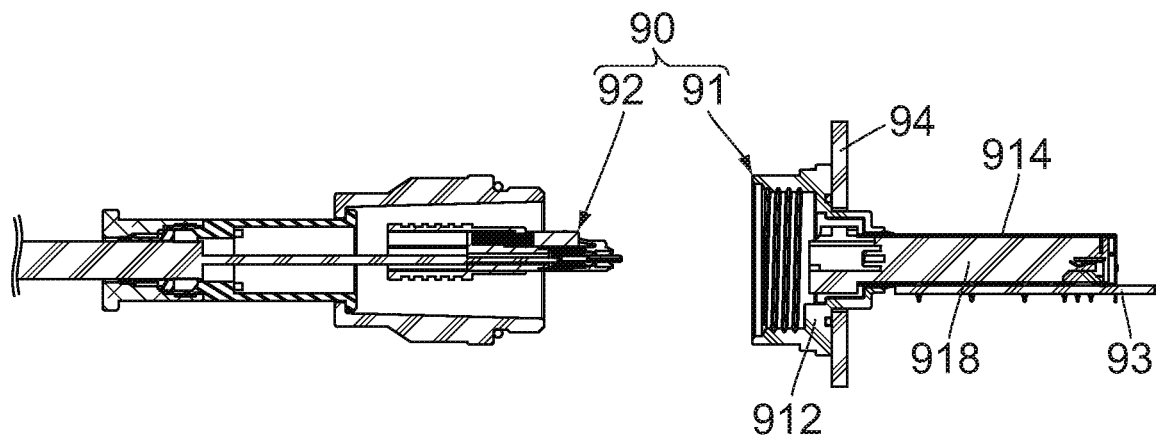
FIG. 31 is a cross-sectional view showing a connector assembly of Patent Document 1.
Figure 32:
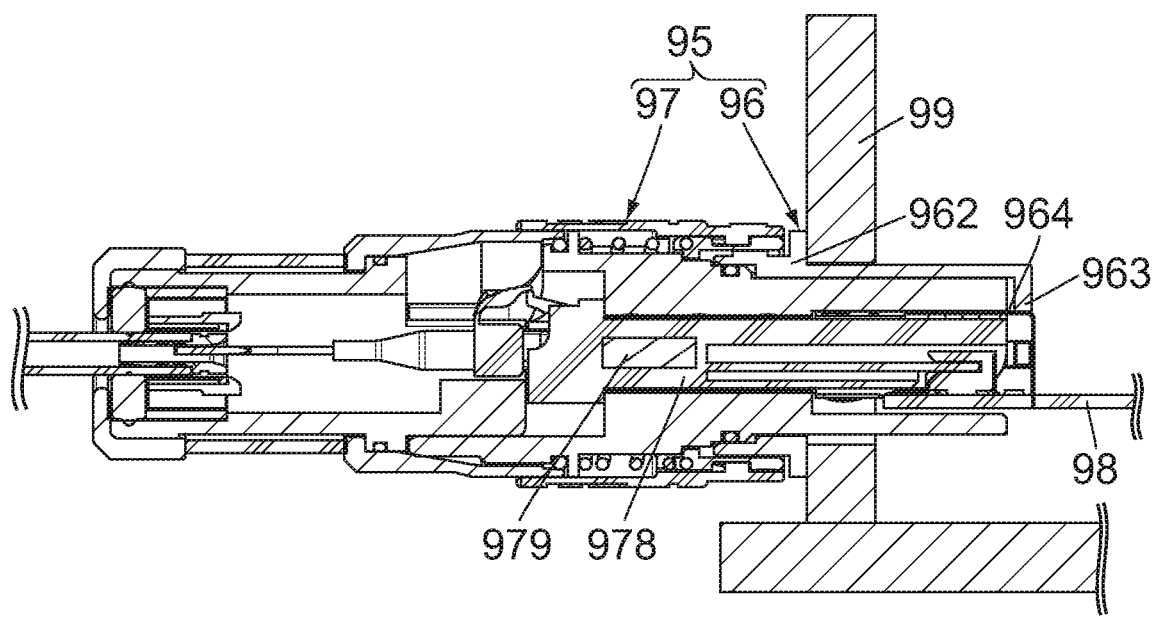
FIG. 32 is a cross-sectional view showing a connector assembly of Patent Document 2.

Referring to FIGS. 28 and 30, the receptacle 20C comprises the internal module 12, the internal connector 22, a shell 30C made of metal and a cage 40C formed of a metal plate. The shell 30C is attachable to a case 80C made of metal. The cage 40C is mountable on a board 82C arranged in the case 80C. In the present embodiment, the internal module 12 is accommodated in the receptacle 20C. In other words, the connector assembly (not shown) according to the present embodiment accommodates the internal module 12 installed in the receptacle 20C.

Figure 27:
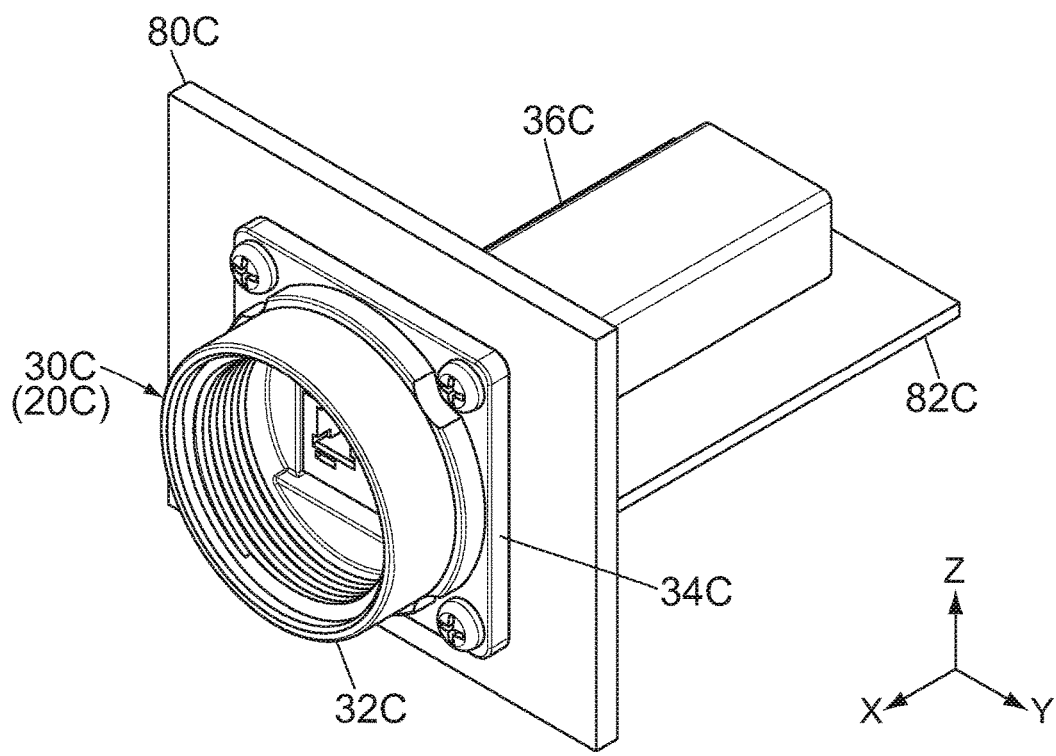
FIG. 27 is a perspective view showing a modification of the receptacle of FIG. 1, wherein the receptacle is attached to a case and a board.

Referring to FIGS. 27 and 28, the shell 30C has an annular portion 32C, a flange 34C and a covering portion 36C. The annular portion 32C is located at a front end portion of the shell 30C. The flange 34C is located rearward of the annular portion 32C. The covering portion 36C extends rearward from the flange 34C. When the receptacle 20C is used, the flange 34C is attached to the case 80C and is in surface contact with the case 80C. Meanwhile, the covering portion 36C extends rearward through a passing hole 802C of the case 80C.

Referring to FIGS. 28 and 30, the cage 40C of the present modification is a single metal plate with bends and has a receiving space 41C and a plurality of enclosing plates 42C. Referring to FIG. 30, the receiving space 41C opens at the front end 40F of the cage 40C in the front-rear direction (X-direction). In the present modification, the internal module 12 is located in the receiving space 41C. Thus, the receiving space 41C receives the internal module 12 also under a mated state where the plug (not shown) and the receptacle 20C are mated with each other.

Referring to FIGS. 28 and 30, the enclosing plates 42C includes a cage rear plate 422C, a cage top plate 424C and two cage side plates 428C. The cage rear plate 422C is located behind the receiving space 41C in the X-direction. The cage top plate 424C is located over the receiving space 41C in the upper-lower direction (Z-direction). The two cage side plates 428C are located at opposite sides of the receiving space 41C in the lateral direction (Y-direction), respectively.

Referring to FIG. 30, the cage 40C is provided with the terminal 48 made of metal and a contact portion 44C made of metal. The terminal 48 extends downward from the cage rear plate 422C. The contact portion 44C is nearer to the cage rear plate 422C than to the front end 40F of the cage 40C in the X-direction. The contact portion 44C has a spring portion 446C and a contact point 448C. When the cage 40C is mounted on the board 82C and the shell 30C is attached to the case 80C, the shell 30C covers the cage 40C, the terminal 48 is fixed to the board 82C, and the spring portion 446C presses the contact point 448C against the covering portion 36C of the shell 30C.

According to the present modification, heat generated in the board 82C is transferred to the shell 30C and the case 80C each having large heat capacity through the terminal 48 made of metal, the cage 40C formed of the metal plate and the contact portion 44C made of metal. Thus, the receptacle 20C is formed with a heat-transfer path that efficiently transfers the heat from the board 82C to the case 80C, so that influence of heat on the internal module 12 can be reduced.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A receptacle of a connector assembly, the connector assembly including a plug that is mateable with the receptacle and accommodating an internal module therein, wherein:
the receptacle comprises a shell made of metal and a cage formed of one or more metal plates, the shell being attachable to a case made of metal, and the cage being mountable on a board arranged in the case;
the cage has a receiving space and a plurality of enclosing plates;
the receiving space opens at a front end of the cage in a front-rear direction and is configured to receive the internal module in a mated state in which the plug and the receptacle are mated with each other;
the enclosing plates include a cage rear plate, a cage top plate and two cage side plates;
the cage rear plate is located behind the receiving space in the front-rear direction;
the cage top plate is located over the receiving space in an upper-lower direction perpendicular to the front-rear direction;
the two cage side plates are located at opposite sides of the receiving space, respectively, in a lateral direction perpendicular to both the upper-lower direction and the front-rear direction;
the cage is provided with a terminal made of metal and a contact portion made of metal;
the terminal extends downward from the cage rear plate;
the contact portion is nearer to the cage rear plate than to the front end of the cage in the front-rear direction;
the contact portion has a spring portion and a contact point; and
when the cage is mounted on the board and the shell is attached to the case, the shell covers the cage, the terminal is fixed to the board, and the spring portion presses the contact point against the shell.

2. The receptacle as recited in claim 1, wherein:
the contact portion is provided on at least one of the cage rear plate and one of the enclosing plates that is connected directly to the cage rear plate;
the cage is provided with an additional contact portion made of metal;
the additional contact portion is provided on at least one of the enclosing plates, the at least one of the enclosing plates being one of the cage top plate and the cage side plates that is not provided with the contact portion;
the additional contact portion has a bent portion, an additional spring portion and an additional contact point;
the bent portion is connected directly to the enclosing plate that is provided with the additional contact portion;
the enclosing plate that is provided with the additional contact portion has no part that is located rearward of a boundary portion between the bent portion and the enclosing plate and that is connected to the cage rear plate;
the additional spring portion extends forward and inward of the cage from the bent portion;
the additional contact point is supported by the additional spring portion; and
the additional spring portion presses the additional contact point against the internal module in the mated state.

3. The receptacle as recited in claim 2, wherein:
the cage is provided with an auxiliary contact portion made of metal; and
the auxiliary contact portion is provided on the enclosing plate that is provided with the additional contact portion.

4. The receptacle as recited in claim 2, wherein:
the cage top plate is provided with the contact portion; and
at least one of the cage side plates is provided with the additional contact portion.

5. The receptacle as recited in claim 4, wherein:
the cage comprises a base and a cover;
each of the base and the cover is a single metal plate with bends;
the base has a base rear plate, a base top plate, a base bottom plate and two base side plates;
the base has five bends which are two first bends, two second bends and a third bend, the first bends being formed between the base bottom plate and the base side plates, respectively, the second bends being formed between the base top plate and the base side plates, respectively, and the third bend being formed between the base top plate and the base rear plate;
the cover has a cover top plate;
the cage rear plate includes the base rear plate;

the cover top plate is attached to the base top plate and forms the cage top plate together with the base top plate;

the cage side plates include the base side plates, respectively;

the cover top plate is provided with the contact portion; and at least one of the base side plates is provided with the additional contact portion.

6. The receptacle as recited in claim 1, wherein:

the contact portion is provided on at least one of the enclosing plates;

the cage is provided with an additional contact portion made of metal;

the additional contact portion is provided on at least one of the cage top plate and the cage side plates;

the additional contact portion has a bent portion, an additional spring portion and an additional contact point;

the bent portion is connected directly to the enclosing plate that is provided with the additional contact portion;

the additional spring portion extends rearward and inward of the cage from the bent portion;

the additional contact point is supported by the additional spring portion;

the additional spring portion presses the additional contact point against the internal module in the mated state;

the additional contact portion has a boundary portion formed between the bent portion and the enclosing plate that is provided with the additional contact portion; and a distance between the cage rear plate and the boundary portion is longer than another distance between the cage rear plate and the additional contact point.

7. The receptacle as recited in claim 2, wherein a first creepage path is from the terminal to the contact point along at least one of the metal plates that form the cage, a second creepage path is from the terminal to the additional contact point along at least one of the metal plates that form the cage, and a length of the first creepage path is shorter than another length of the second creepage path.

8. The receptacle as recited in claim 1, wherein:

the internal module is accommodated in the plug;

the shell is formed with a plug receiving space; and the plug receiving space receives the plug in the mated state.

9. The receptacle as recited in claim 1, wherein the internal module is an optical communication module.

* * * * *